(12) United States Patent
Eagon et al.

(10) Patent No.: US 8,234,174 B1
(45) Date of Patent: Jul. 31, 2012

(54) METHOD AND APPARATUS FOR CREATING CUSTOM ADVERTISEMENTS

(76) Inventors: Grant A. Eagon, Huntington, WV (US);
Diana M. Eagon, Huntington, WV (US);
Ian C. Greene, Huntington, WV (US);
Rex W. Eagon, Huntington, WV (US)

( * ) Notice: Subject to any disclaimer, the term of this patent is extended or adjusted under 35 U.S.C. 154(b) by 2514 days.

(21) Appl. No.: 10/657,853

(22) Filed: Sep. 9, 2003

Related U.S. Application Data

(60) Provisional application No. 60/409,452, filed on Sep. 10, 2002.

(51) Int. Cl.
*G06G 1/14* (2006.01)

(52) U.S. Cl. ............. 705/22; 705/28; 705/14.4; 705/26; 705/317; 709/200

(58) Field of Classification Search .................. 705/28, 705/26, 22, 27; 709/200; 707/104.1, 10
See application file for complete search history.

(56) References Cited

U.S. PATENT DOCUMENTS

| | | | |
|---|---|---|---|
| 5,327,265 A | 7/1994 | McDonald | |
| 5,721,908 A | 2/1998 | Lagarde | |
| 5,760,917 A | 6/1998 | Sheridan | |
| 5,761,404 A | 6/1998 | Murakami et al. | |
| 5,781,773 A | 7/1998 | Vanderpool et al. | |
| 5,813,009 A | 9/1998 | Johnson et al. | |
| 5,813,348 A | 9/1998 | Zingher | |
| 5,832,530 A | 11/1998 | Paknad | |
| 5,835,712 A | 11/1998 | DuFresne | |
| 5,845,299 A | 12/1998 | Arora et al. | |
| 5,890,170 A | 3/1999 | Sidana | |
| 5,897,260 A | 4/1999 | Zingher | |
| 5,913,210 A | 6/1999 | Call | |
| 5,963,925 A | 10/1999 | Kolling | |
| 5,963,968 A | 10/1999 | Warmus | |
| 5,968,119 A | 10/1999 | Stedman | |
| 6,017,157 A | 1/2000 | Garfinkle et al. | |
| 6,023,683 A * | 2/2000 | Johnson et al. ................. | 705/26 |
| 6,028,603 A | 2/2000 | Wang et al. | |
| 6,035,323 A | 3/2000 | Narayen et al. | |
| 6,125,384 A | 9/2000 | Brandt | |
| 6,247,032 B1 | 6/2001 | Bernardo | |
| 6,301,607 B2 | 10/2001 | Barraclough et al. | |
| 6,308,188 B1 | 10/2001 | Bernardo | |

(Continued)

FOREIGN PATENT DOCUMENTS

EP 0 930 774 A2 7/1999

(Continued)

*Primary Examiner* — Vanel Frenel
(74) *Attorney, Agent, or Firm* — Johnston Holroyd; Mary-Jacq Holroyd

(57) ABSTRACT

A method and system for managing inventory information by a host company forming an inventory based information network having multiple tiers of access with at least one host server and at least one remote company user. The host server has an interactive inventory listing, manages remote company user access to the inventory listings, and enables remote access to the host server for the remote company user to create and manage inventory listings. The interactive inventory listing builder creates a new inventory listing, generates an associated unique listing code, and adds a photo file and text data. The method generates interactive advertisements and websites. The interactive advertisement builder creates a new advertisement, chooses a target media outlet, inserts the inventory listing, and generates and saves advertisement. The interactive website builder allows a user to select a template, add object files, choose domain names, and save the website.

45 Claims, 51 Drawing Sheets

U.S. PATENT DOCUMENTS

| | | |
|---|---|---|
| 6,341,271 B1 * | 1/2002 | Salvo et al. .................. 705/28 |
| 6,381,029 B1 | 4/2002 | Tipirneni |
| 6,397,226 B1 * | 5/2002 | Sage ....................... 707/104.1 |
| 6,516,340 B2 | 2/2003 | Boys |
| 6,539,420 B1 | 3/2003 | Fields et al. |
| 6,542,936 B1 | 4/2003 | Mayle et al. |
| 6,628,417 B1 | 9/2003 | Naito et al. |
| 6,732,162 B1 | 5/2004 | Wood et al. |
| 2001/0037255 A1 * | 11/2001 | Tambay et al. ............. 705/26 |
| 2002/0002579 A1 * | 1/2002 | Holden et al. ............ 709/200 |
| 2002/0035494 A1 | 3/2002 | Eckes |
| 2002/0036654 A1 | 3/2002 | Evans |
| 2002/0049788 A1 | 4/2002 | Lipkin |
| 2002/0065739 A1 | 5/2002 | Florance |
| 2003/0158796 A1 * | 8/2003 | Balent ......................... 705/28 |
| 2003/0177069 A1 * | 9/2003 | Joseph ........................ 705/22 |
| 2004/0128697 A1 | 7/2004 | Wood et al. |

FOREIGN PATENT DOCUMENTS

| | | |
|---|---|---|
| EP | 0 939 516 A2 | 9/1999 |

* cited by examiner

212

| ☐ EASy System — New Agent Entry Form — Microsoft Internet Explorer ☐ ☐ ☒ |
| File  Edit  View  Favorites  Tools  Help |

New Agent Entry Form       202

First Name: [    ]      Last Name: [    ]

(No Spaces in the userName or Password, please.)
204
User Name: [    ]      Password: [    ]    206

Company/Broker: Eagon Real Estste Company MLSID: boom99:

Individual's MLS: [ *216* ]      Billing Contact: [    ]

Address: [    ]      Box or Suite #: [    ]

214

City: [    ]      State: [  ]   Zip: [    ]

Phone: [    ]      Toll-Free: [    ]

Fax: [    ]      E-Mail: [    ]

[ Insert Date ]  [ Clear Form ]

☐ Done

EASy - New Listing Form — Microsoft Internet Explorer

File   Edit   View   Favorites   Tools   Help

New Listing Form
[Required fields appear in red. Please do not use '#' or "'" (apostrophe) characters in your MLS identifiers.]
Listing Agent: Diana Eagon   Company: Eagon Real Estate   Market: Greenville, SC
Company MLS SID # boom99   Personnal MSLID# 8   Listing ML SID # — 293

Seller's Information
The following information will not appear on the listing web page. It will only be used for production of the seller's letter report.

Seller's First Name: [          ]   Last Name: [          ]
Address: [          ]   PO or Rt.: [          ]
City: [          ]   County: [          ]
State: [   ]   Zip: [          ]

Directions:
[          232          ]

} 230

Listing Expiration Date [          ] 234 (i.e. 12/31/99)
Listing Warning Date [          ] 236 (i.e. 12/31/99)

Photo Information
○ Photo Needed -Please Take a Picture! 240
● I already have a photo 242
Please indicate How You'll Send It or if EASy Shoot Date:
244 [08-11-2003]     [-select-  ▽] 246
Our staff will follow the directions you listed in the direction box above!

Cont. from Fig. 9A

Listing Ad Copy. [Enter text as you would like it to appear in your ads]
YOU CANNOT USE A # OR APOSTROPHE IN YOUR AD - EASY WILL DELETE IT!

*248*

Classification: Select a Classification
1550 Condos for Sale
1560 Open House — *250*

Real Estate Information
The following information will be used on your listing web page only.
Price: *254*  Number of Rooms: *256*  Number of Bedrooms: *258*
Number of Full Baths: *260*  Number of Half Baths: *262*
Dining Room Info: *264*
Basement: *266*  Garage: *268*
Heating: *270*  Flooring: *272*
Total Sq Ft: 0  *274*

*252* — *276*

Room Sizes
Livingroom:  Dining Room:
Kitchen:  Family Room:  Rec Room:
Den:  Utility:
Master Bedroom:  Bedroom 2:  Bedroom 3:
Bedroom 4:  Bedroom 5:

*278*

Lot and Legal Information
MLS Area: *280*  Subdivision: *282*
Lot Size Front:  Lot Size Back:
Lot Size Left:  Lot Size Right:  *284*
Acres:  Water:  Sewer:  Roof:  Walls:
Windows:  Appliances:  Outside:  Interior:  *286*
Elementary School: -- Select School --
Jr/Middle School: -- Select School --  *288*
Senior High School: -- Select School --

Cont. from Fig. 9B

This information will be seen by your customers on your listing webpage!

Comments: 257

This information will only be seen by inter-office personnel.

Comments: 259

Submit Listing to Database — 260

☐ Done

```
┌─────────────────────────────────────────────────────┐
│ ☐ Your Personal and Company Listings — Microsoft Internet Explorer  _ □ ⊠ │
│ File  Edit  View  Favorites  Tools  Help            │
```

Your Personal Listing Inventory

MLS: 789684 ⟵ 293
Address: 4 Oakwood Pl.      View Details
Seller: Jackie Bear        Update     ⟶ 292
Price $345,000.00       Delete
EASy# 2559             View Ads Placed
           300 ⟋

Company Listing Inventory

MLS: 234450
Address: 12 Teacup Dr     View Details
Seller: Eagon Real Estate  Update
Price $150,000          Delete
EASy# 2324            View Ads Placed MLS: 101194
Address: 440 HWY 11     View Details
Seller: Eagon Real Estate  Update
Price $170,000          Delete
EASy# 2234            View Ads Placed MLS: 334590
Address: 507 Glen Laurel  View Details
Seller: Eagon Real Estate  Update
Price $250,000          Delete
EASy# 2199            View Ads Placed MLS: 24459
Address: 135 Main St.     View Details
Seller: Eagon Real Estate  Update
Price $300,000          Delete
EASy# 2281            View Ads Placed MLS: 345222
Address: 345 Betty Rd.    View Details
Seller: Eagon Real Estate  Update
Price $345,000          Delete
EASy# 2167            View Ads Placed Back to EASy TOOLBOX!

☐ Done

*Fig. 10*

```
┌─────────────────────────────────────────────────────────────────┐
│ ☐ Jackie's Listing Index 11-Aug-03 — Microsoft Internet Explorer   _ □ ⊠ │
├─────────────────────────────────────────────────────────────────┤
│ File  Edit  View  Favorites  Tools  Help                        │
├─────────────────────────────────────────────────────────────────┤
```

Detailed Listing Information

Listing MLSID: #334455 — 293
Address: 123 Right Way
Price: $325,000.00

| Company<br>Agent: David Bell<br>Company: Eagon Real Estate<br>Company: MLSID: boom99 | Address<br>123 Right Way<br>Greenville, SC<br>Zip: 29605<br>County: |
|---|---|
| Rooms: 0<br>Bedroms: 4<br>Full Baths: 3<br>Half Baths: 1<br>Dining Room:<br>Living Room Size:<br>Dining Room Size:<br>Kitchen Size:<br>Family Room Size:<br>Rec Room Size:<br>Den Size:<br>Master Bed Size:<br>2nd Bed Size:<br>3 Bed Size:<br>4 Bed Size:<br>5 Bed Size:<br>Utility Size: | Outside<br>Subdivision:<br>Lot Size Front:<br>Lot Size Back:<br>Lot Size Left:<br>Lot Size Right:<br>Acres:<br>Water:<br>Sewer:<br>Roof:<br>Exterior: |
| Inside<br>Basement:<br>Garage:<br>Heating:<br>Flooring:<br>Total Sq Ft:<br>Walls:<br>Appliances:<br>Interior:<br>Windows: | Private<br>Seller: David Bell<br>Seller's Phone:<br>Legal:<br>Comments:<br>Remarks:<br>Photo: Client says we'll have it<br>Listing Expiration: 12/31/03<br>Listing Warning: 12/15/03<br>Listing Ad Copy: Beautiful 4 bedroom house! Great curb apeal, wooded lot,. Private setting with lots of extras!<br>Directions: |
| Schools<br>Elementary School: Augusta Circle<br>Jr./Middle School:<br>Senior High School:<br>Back to EASy TOOLBOX! | Photos |

☐ Done

*Fig. 11*

296
┌─ EASy — New Listing Form — Microsoft Internet Explorer ─── □ ▢ ⊠
File  Edit  View  Favorites  Tools  Help Update Listing Form
[Required fields appear in red - Do NOT USE # character or the apostrophe!]

Listing MLSID: 789684 ~~293
304~ Address: 4 Oakwood Pl.
Price: $345,000

Company                          Address
Agent: [     ]                   Address: [     ]
322~ Company: Eagon Real Estate  Address (Continued):     324
Company MLSID: (boom99)          [     ]

Rooms: [  ]                      City: [    ]
Bedrooms: [    ]                 State: [  ]
Baths: [   ]                     MLS Area: [     ] ~~326
Half Baths: [   ]                Zip: [    ]
Dining Room Info:                County: [    ]
[          ]
Dining Room [     ]              Copy
Living Room [     ]              Listing Ad Copy:        ~340
Kitchen: [    ]                  [                ]
328~ Family Room [    ]
Rec Room: [    ]
Den: [   ]
Master Bed: [    ]
2nd Bed: [   ]
3 Bed: [   ]
4 Bed: [  ]                      Outside
5 Bed: [  ]                      Subdivision: [    ]
Utility Room [    ]              Lot Size Front: [    ]
                                 Back Lot Size: [   ]    ~332
Inside                           Left Lot Size: [    ]
Basement: [     ]                Right Lot Size: [    ]
Garage: [    ]                   Acres: [    ]
Heating: [    ]                  Water: [    ]
330~ Flooring: [    ]            Sewer: [    ]
Total SqFt: [   ]                Roof: [   ]
Walls: [   ]                     Exterior: [    ]
Windows: [    ]
Appliances: [   ]
Interior: [    ]

Cont. from Fig. 12A

360° Photos
360# 1: Update [____] Link
Name: [____]
Caption: [____]

342 — 360# 1: New
Name: [____]
Caption: [____]

360# 1: New
Name: [____]
Caption: [____]

Schools
Elementary School:
336 — [____ ▽]
Jr/Middle School:
[____ ▽]
Senior High School:
[____ ▽]

Floor Plans
Floor Plan #1: Add Floor Plan
Name: [____]
Caption: [____]

344 — Floor Plan #2: Add Floor Plan
Name: [____]
Caption: [____]

Floor Plan #3: Add Floor Plan
Name: [____]
Caption: [____]

Back to Listing List
Back to EASy TOOLBOX

☐ Done

Private
Seller's First Name: [____]
Seller's Last Name: [____]
Seller's Phone: [____]                  296
Legal: [____]
Legal: [____]                            334
Comments:
(this appears on your website)
[_____△]
[                       ]
[_____▽]

Remarks:
(this is hidden from your website)
[_____△]
[                       ]
[_____▽]

Photo: Client says we'll have it -- Photo by
Listing Expiration Date:
[____]
Listing Warning Date:
[____]
Directions:
[_____△]
[                       ]
[_____▽]

Photos                               338
Print Photos
No Printable Photos Found
Web Photos (click thumbnail to update)
Main Photo:
[__]
Extra Photos:
1[__] 2[__] 3[__] 4[__] 5[__]
Extra Photo Text:
Photo 1: [____]
Photo 2: [____]
Photo 3: [____]
Photo 4: [____]
Photo 5: [____]
[ Save ]

*Fig. 12B*

```
┌─────────────────────────────────────────────────────────────────┐
│ ☐ Searchlisting - Detail — Microsoft Internet Explorer    _ ☐ ☒ │
│ File   Edit   View   Favorites   Tools   Help                   │
│ ┌─────────────────────────────────────────────────────────────┐ │
│ │                    Delete Listing Form                      │ │
│ │ Marketing Ageny: David Bell  Company: Eagon Real Estate     │ │
│ │ Company ML SID: boom99  Listing ML SID: #334455  Seller's Name: David Bell │ │
│ │ Address: 123 Right Way  City: Greenville  County:  State: SC  Zip: 29605   │ │
│ │ Seller's Phone:    Price: @325,000.00                       │ │
│ ├─────────────────────────────────────────────────────────────┤ │
│ │ Rooms: 0  Bedrooms: 4  Full Baths: 3  Half Baths: 1         │ │
│ ├─────────────────────────────────────────────────────────────┤ │
│ │ Listing Expiration Date: 31-Dec-03  Listing Warning Date: 15-Dec-03 │ │
│ ├─────────────────────────────────────────────────────────────┤ │
│ │ The following information must be completed to delete this listing from your │ │
│ │ personal or company inventory!                              │ │
│ │ Why?   ⦿ Sold   ○ Contract Expired   ○ Withdrawn            │ │
│ │ When did home sell? month [    ]  day [    ]  year [    ]   │ │
│ │                          (i.e. 6/10/2003)                   │ │
│ │ Selling price? [            ]  (i.e. $100,000)              │ │
│ │ Closing Comments?                                           │ │
│ │ ┌─────────────────────────────────────────────────────────┐ │ │
│ │ │                                                         │ │ │
│ │ │                                                         │ │ │
│ │ │                                                         │ │ │
│ │ └─────────────────────────────────────────────────────────┘ │ │
│ │                      [ Delete Listing ]                     │ │
│ └─────────────────────────────────────────────────────────────┘ │
│ ☐ Done                                                          │
└─────────────────────────────────────────────────────────────────┘
```

*Fig. 13A*

Cont. from Fig. 15A

Browse and Select Ad Formats:
- ○ Full Page
- ● Half Page
  - GV5H12
- ○ Quarter Page
- ○ Eighth Page
- ○ Sixteenth Page
- Clear Viewer Box

| header | | | |
|---|---|---|---|
| 1 | 2 | 3 | 4 |
| 5 | 6 | 7 | 8 |
| 9 | 10 | 11 | 12 |

*378*

<--- First, use the drop down boxes to browse the formats... then select the size with the radio buttons. The format listed in that size box will be selected for you! [If format does not load over last image, click "Clear Viewer Box" and try again]

Choose a background for your ad.
[Click on the Underlinked colorname to view the color]
You must click on the radio button to select it as your background.

○ None  ○ aqua  ○ aqua.bright  ○ aqua.pale  ○ autumn.pond  ○ beige
○ bird.in.flight  ○ black  ○ blue  ○ blue.barely  ○ blue.caldwell.banker
○ blue.dark.dusty  ○ blue.dark.ocean  ○ blue.darker  ○ blue.dusty.pale
○ blue.green  ○ blue.green.barely  ○ blue.green.pale  ○ blue.ice
○ blue.light  ○ blue.ocean  ○ blue.pale  ○ blue.prodential  ○ blue.remax
○ blue.robin.egg  ○ blue.teal  ○ bluish.grey  ○ bone  ○ brown
○ brown.bhg  ○ brown.darker  ○ brown.heavy.dark  ○ brown.light
○ brown.lighter  ○ burgundy  ○ c21.gold  ○ charcoal  ○ Chianti  ○ clouds
○ cocoa  ○ coral  ○ coral.light  ○ cotton.candy  ○ cyan  ○ cyan.darker
○ cyan.soft  ○ dbl.waterfalls  ○ diamonds  ○ edgewater  ○ era.blue
○ era.red  ○ fire.wind  ○ flesh  ○ forest  ○ glacial.ice  ○ gold  ○ gold.c21
○ gold.dark  ○ gold.light  ○ golden.gradient  ○ grape.gradient  ○ grey
○ grey.barely  ○ green  ○ green.bhg  ○ green.blue  ○ green.bright
○ green.dark  ○ green.darker  ○ green.light  ○ green.light.dusty
○ green.lime  ○ green.mint  ○ green.muddy  ○ green.pale  ○ green.pea
○ green.pine  ○ green.soft  ○ grey  ○ grey.blue  ○ grey.dark  ○ grey.darker
○ greyish.green  ○ ice.tapestry  ○ lavender  ○ lavender.dark
○ lavender.dusty  ○ lavender.pale  ○ lilac  ○ lilac.deep  ○ magenta
○ maroon.marble  ○ melon  ○ moon.scape  ○ olive  ○ orange
○ orange.bright  ○ orange.deep  ○ orange.red  ○ pastel.starburst  ○ peach
○ peach.barely  ○ peach.light  ○ peach.pale  ○ peach.soft  ○ pink
○ pink.barely  ○ pink.light.dusty  ○ pink.medium  ○ pink.pale  ○ pumpkin
○ purple  ○ purple.deep  ○ purple.dusty  ○ purple.lighter
○ purple.majesty  ○ red  ○ red.bhg  ○ red.blue.gradient  ○ red.brick
○ red.clay  ○ red.dark  ○ red.darker  ○ red.orange  ○ red.remax
○ rings.of.saturn  ○ rose  ○ rose.dark  ○ rose.deep  ○ rose.pale  ○ sage
○ same.as.before  ○ sand  ○ saphire.brown  ○ sunset.crystals  ○ tan
○ taupe  ○ taupe.light  ○ trees.background  ○ violet  ○ violet.lighter
○ wedgewoo  ○ white  ○ windy.fall  ○ wood.grain  ○ yellow
○ yellow.barely  ○ yellow.bright  ○ yellow.dark  ○ yellow.medium
○ yellow.pale

| Continue to Home Selection and Ad Copy |

☐ Done

*Fig. 15B*

┌─────────────────────────────────────────────────────── ─384
│ ☐ http://www.easyads.net/getissue.cfm — Microsoft Internet Explorer  _ ☐ ⊠
│ File  Edit  View  Favorites  Tools  Help
├───────────────────────────────────────────────────────
│                     Your Information
│
│ Your Name: Diana Eagon
│ Address: 5476 Big Tyler Rd., Suite A
│ Spartansburg, SC  29609                                   *386*
│ Phone: 864-222-111 Toll-Free:
│ Fax: 864-222-1112  E-mail: deeagon@realtornet.net
├───────────────────────────────────────────────────────
│
│ Your Company/Broker: Eagon Real Estate
│ MLS: (boom99)                                             *388*
│ Real Estate Market: Greenville, SC
├───────────────────────────────────────────────────────
│ Here are your advertising specs:
│   o Issue: Greenville Real Estate Guide Weekly Color
│   o Street Date: 25-Aug-03
│   o Due Date: 12-Aug-03
│   o Format: GV5H12                                        *390*
│   o Ad size: half
│   o Number of pics: 12
├───────────────────────────────────────────────────────
│
│        Here is the Ad Format you selected: GV5H12
│
│                 ┌──────────────────────┐
│                 │       header         │
│                 ├─────┬─────┬─────┬────┤
│                 │  1  │  2  │  3  │ 4  │
│                 ├─────┼─────┼─────┼────┤    *392*
│                 │  5  │  6  │  7  │ 8  │
│                 ├─────┼─────┼─────┼────┤
│                 │  9  │ 10  │ 11  │ 12 │
│                 └─────┴─────┴─────┴────┘
│                                              ─394
│        Size=half -- Here is the background you chose: ☐

Cont. from Fig. 16A

[Please enter the Red Home Number indicated beside below.]
You may refine the Ad Copy Selection in the next step.

| | |
|---|---|
| Position 1 Home:: | 43147 |
| Position 2 Home: | 7562 |
| Position 3 Home: | 681 |
| Position 4 Home:: | 2775 |
| Position 5 Home: | 22261 |
| Position 6 Home: | 7645 |
| Position 7 Home:: | 43147 |
| Position 8 Home: | 7562 |
| Position 9 Home: | 681 |
| Position 10 Home: | 2775 |
| Position 11 Home: | 22261 |
| Position 12 Home: | 7645 |

400

Select the Homes you Wish to Advertise: 396

Total Eagon Real Estate Listings: 15

Other Eagon Real Estate Listings: 398

- 43147 - Agent: Grinning Possum Seller: Address: Possum picture Expires: 21-Jan-05 MLS: 16896 $: #1,000,000,000.00
- 7562 - Agent: Buck Boone Seller: test Address: 745 Pleasantburg Expires: 30-Dec-03 MLS: 1002312 $: $745,000.00
- 681 - Agent: Buck Boone Seller: Buck Boone Address: 10 Bramblewood Terrace Expires: 31-Dec-04 MLS: 9898989 $: $365,000.00
- 27755 - Agent: David Bell Seller: David Bell Address: 123 Right Way Expires: 31-Dec-03 MLS: 334455 $: $325,000.00
- 22261 - Agent: David Bell Seller: Smith James Address: 122 Dell St. Expires: 31-Dec-03 MLS: 125476 $: $300,000.00
- 7645 - Agent: Buck Boone Seller: Test Ronnie Address: 123 Main St. Expires: 21-Dec-03 MLS: 54554 $: $199,900.00
- 34595 - Agent: Dena Pittman Seller: Mark Pittman Address: 11144 Lake Circle Expires: 31-Dec-03 MLS: 23467 $: $101,000.00

402

| Update Ad Copy for Homes | Clear Form |

☐ Done

Create Your Ad Copy

Your Name: Jackie Bear
Your Company/Broker: Eagon Real Estate
Address: 5476 Big Tyler Rd. Suite A.
Spartanburg, SC 29606
Phone: 864-222-1111 Toll-Free:
Fax: 864-22-1112 E-mail: jb@realtornet.net

*386*

Your Company/Broker: Eagon Real Estate
MLS: (boom99)
Real Estate Market: Greenville, SC

*388*

Here are your advertising specs:
- Issue: Greenville Real Estate Guide Weekly Color   *390*
- Street Date: 25-Aug-03
- Due Date: 12-Aug-03
- Format: OV5H12   *406*
  (You may click on the format code to see the layout again.)
- Ad size: half
- Number of pics: 12

Update Your Listing Ad Copy Per Home

*408*

Below is the copy that you entered for each listing when you created that listing. You may modify that copy by clicking in the copy box for each listing or you may use the same copy that you originally entered. If you choose to modify the copy, the modification will be saved and replace the original copy you entered.
REMEMBER, YOU CANNOT USE THE # OR APOSTROPHE IN YOUR AD COPY. EASY WILL DELETE THEM!
[Listing Agents' Names are Red - Check Your Listings for Errors. You may click your "Back" button and choose again.
EASy does not spell check your ads. Be sure you type correctly!

Cont. from Fig. 17A

Listing Position 1 Home: 43147
Address: Possum picture Listing Agent: Grinning Possum Price
$1,000,000,000.00 Bedrooms: 3
Ad Copy for 43147. (Please review and edit for this ad)
DO NOT USE THE NUMBER SIGN OR APOSTROPHE!

410 {
| Relocation |
| *412* |

Banner for this Home?
◉ None ○ Reduced ○ Sold ○ New Construction ○ Acreage
○ Under Contract ○ Price ○ MLS# ○ Copyblock ←————413
Click here to see this listing's info!

Listing Position 2 Home: 7562
Address: 745 Pleasantburg Listing Agent: Buck Boone Price
$745,000.00 Bedrooms: 4
Ad Copy for 7562 (Please review and edit for this ad)
DO NOT USE THE NUMBER SIGN OR APOSTROPHE!

| This is an example of how easy it is to change your copy. You see I really am glad I did. |

Banner for this Home?
◉ None ○ Reduced ○ Sold ○ New Construction ○ Acreage
○ Under Contract ○ Price ○ MLS# ○ Copyblock
Click here to see this listing's info!

Listing Position 12 Home: 46496
Address: 1427 5th Listing Agent: Buck Boone Price $119,900.00
Bedrooms: 3
Ad Copy for 46496: (Please review and edit for this ad)
DO NOT USE THE NUMBER SIGN OR APOSTROPHE!

| thids |

Banner for this Home?
◉ None ○ Reduced ○ Sold ○ New Construction ○ Acreage
○ Under Contract ○ Price ○ MLS# ○ Copyblock
Click here to see this listing's info!

414 —— | Ad Confirmation | Clear Form |

☐ Done

| ☐ http://www.easyads.net/adconfirm2.cfm — Microsoft Internet Explorer ☐ ▢ ✕ |
| File  Edit  View  Favorites  Tools  Help |

Confirmation — Ad Instructions

Your Name: Diana Eagon
Your Company/Broker: Eagon Real Estate                                 *388*
MLS: (boom99)
Real Estate Market: Greenville, SC

*418*

Billing Information: ● Bill Me!  ○ Bill my company
If copy doesn't fit ad space  ● Edit Copy for Me  ○ Reduce Font Size to Fit Here are your advertising specs:

o Issue: Greenville Real Estate Guide Weekly Color
  o Street Date: 25-Aug-03
  o Due Date: 12-Aug-03                                               *420*
  o Format: GV5H12
  o Ad size: half
  o Number of pics: 12
  o Background: none

☐

Your Listing Ad Copy
Ads with Pictures

Position 1: 43147
Address: Possum picture
Ad Copy: Beautiful, spacious, stocked pond, boathouse               *422*
Banner: none Position 2: 7562
Address: 745 Pleasantburg
Ad Copy: Nice Starter
Banner: none Position 3: 681
10 Bramblewood Terrace mud room.
Banner: none Position 12: 46496
Address: 1427 5th
Ad Copy: thids
Banner: none

*424*

[ I have checked this ad and I want to submit this to the publication ]

☐ Done

| http://www.easyads.net/final.cfm — Microsoft Internet Explorer |
| File  Edit  View  Favorites  Tools  Help |

Ad Copy and Listing Confirmation
Purchase Order
[Please Print this Page and the Format for
Faxing and For Your Records]
Ad Number: 24169]

Your Name: Diana Eagon
Your Company/Broker: Eagon Real Estate
Address: 5476 Big Tyler Rd.
Spartanburg SC  29606
Phone: 884-222-1111 Toll-Free:
Fax: 864-222-1112 E-mail: deeagon@realtornet.net

_428_

Your Company/Broker: Eagon Real Estate
MLS: (boom99)
Real Estate Market: Greenville, SC

_388_

Here are your advertising specs:
- Header/Border: Please put all agents in alphabetical order and place a blue line around each home.
- Issue: Greenville Real Estate Guide Weekly Color
- Street Date: 25-Aug-03
- Due Date: 12-Aug-03
- Format: GV5H12
- Ad size: half
- Number of pics: 12
- Background: none
- Copy Fitting: edit
- Billing: self

_430_

Your Listing Ad Copy

Ads with Pictures
Position 1 Home: 43147 Address: Possum picture
Ad Copy: Ain't nutin like a grinnin possum!!!
Banner: none

_432_

Position 2: 7562 Address: 745 Pleasantburg
Ad Copy: This is an example of how easy it is to change your copy. You see I really am glad I did. Reduced to only $495,500
Banner: none Position 12: 46496
Address: 1427 5th
Ad Copy: thids
Banner: none

─ 434

Return to EASy TOOLBOX

☐ Done

*Fig. 19*

Cont. from Fig. 22A

Headings 490

The following information is used to add text to your Web Site.
Please enter a headline for your page.
*Search Engines will rank you higher if you only use about a five word title.

| America - The Beautiful |

Please choose the font and style for your headline.
Font: [Verdana ▽]
Style: [Italic ▽]

Please enter a Subheadline or Slogan for your page.

| United We Stand |

Choose font and style of your Subheadline.
Font: [Verdana ▽]
Style: [Italic ▽]

468

Enter Your Company Name: | Eagon Real Estate |

Page Body 492

| Buying a Home? Listing a Home? Relocating? We can help!! A proven team with over 20 years of | Reba specializes in maximizing a Client's Time, by showing real estate properties that are professionally chosen based on a | "In our opinion Reba is unsurpassed and we have arrived at this opinion as a result of her assistance to not only us, but to |

Your Web Address

People will use one of these addresses to get to your website. Don't worry though this is not final!
You get a free domain name with your contract!
Enter your 3 choices for your domain name.
 (Like this: www.mydomain.com)

494

1st choice: | www.EagonRealty.com |
2nd choice: | www.deagon.com |
3rd choice: | www.deeeagon.com |

Specialties 496

What are your specialties?
Specialities identify you to the search engine by stating certain criteria about your web site. The best way to get into a high rating on a search engine is to type descriptive words that depict what your site is about. You musn't type too many repeating words. Try to keep all text that you type as your specialties relevant to the function of your website.
Enter your specialties here:
All specialties must be separated by commas!

| Relocation

Cont. from Fig. 22B

Mug Shot

Click Here
To upload a picture of yourself for your website!
The Photo must be in .jpg/jpeg or .gif format to upload!

501 — [picture] This is the picture we currently have on file for you. If you wish to replace it, click the link above to send a
new photo of yourself EASy will automatically overwright the old picture for you!

500

Company Logo

If you are a franchised company, select your franchise logo here:

[None ▽]

501 —
Diana, Here is your current logo

[ ]

If you'd like to overwrite this logo, Click Here

502

Links for your Web Site

TDX Links
It is not necessary that you enter anything in the IDX fields, if you already have a working IDX solution.

| | | | | |
|---|---|---|---|---|
| IDX Link 1: Text: | MLS | Link: | www.pcsamerica.net | 504 |
| IDX Link 2: Text: | | Link: | | |
| IDX Link 3: Text: | | Link: | | |

Cont. from Fig. 22C

Other Links

| Link 1 | Link 6 _506_ |
|---|---|
| This link will be a | This link will be a |
| ○ Custom Link | ○ Custom Link |
| --- Name of Link: [    ] | --- Name of Link: [    ] |
| --- URL of Link: http:// | --- URL of Link: http:// |
| [    ] | [    ] |
| ◉ Standard Link: [Chamber ▽] | ◉ Standard Link: [Chamber ▽] |

| Link 2 | Link 7 |
|---|---|
| This link will be a | This link will be a |
| ○ Custom Link | ○ Custom Link |
| --- Name of Link: [    ] | --- Name of Link: [    ] |
| --- URL of Link: http:// | --- URL of Link: http:// |
| [    ] | [    ] |
| ◉ Standard Link: [Weather ▽] | ◉ Standard Link: [Weather ▽] |

| Link 3 | Link 8 |
|---|---|
| This link will be a | This link will be a |
| ○ Custom Link | ○ Custom Link |
| --- Name of Link: [    ] | --- Name of Link: [    ] |
| --- URL of Link: http:// | --- URL of Link: http:// |
| [    ] | [    ] |
| ◉ Standard Link: [none ▽] | ◉ Standard Link: [none ▽] |

| Link 4 | Link 9 |
|---|---|
| This link will be a | This link will be a |
| ○ Custom Link | ○ Custom Link |
| --- Name of Link: [    ] | --- Name of Link: [    ] |
| --- URL of Link: http:// | --- URL of Link: http:// |
| [    ] | [    ] |
| ◉ Standard Link: [none ▽] | ◉ Standard Link: [none ▽] |

| Link 5 | Link 10 |
|---|---|
| This link will be a | This link will be a |
| ○ Custom Link | ○ Custom Link |
| --- Name of Link: [    ] | --- Name of Link: [    ] |
| --- URL of Link: http:// | --- URL of Link: http:// |
| [    ] | [    ] |
| ◉ Standard Link: [none ▽] | ◉ Standard Link: [none ▽] |

[ Build It!! ] _508_

Click the button below when you are sure the info above is correct. Don't worry though, you have an infinite number of times that you can change what you have entered.

[ Build My Webpage!! ] _510_

☐ Done

| | searchlisting — Search Result — Microsoft Internet Explorer | | | | | | |
|---|---|---|---|---|---|---|---|
| File | Edit View Favorites Tools Help | | | | | | |

524

Search Result
Listings Returned: 21

| | Company | Address | MLS# | Price | Beds | Baths | Total SQFT |
|---|---|---|---|---|---|---|---|
| [detail] | Eagon Real Estate | 123 N. Main | 1024489 | $125,000 | 2 | 2 | 1001-1500 |
| [detail] | Eagon Real Estate | 12 Teacup Dr | 234450 | $150,000 | 2 | 2 | 1001-1500 |
| [detail] | Eagon Real Estate | 440 HWY 11 | 101194 | $170,000 | 3 | 4 | 1501-2000 |
| [detail] | Eagon Real Estate | 507 Glen Laurel | 334590 | $250,000 | 3 | 5 | 2001-2500 |
| [detail] | Eagon Real Estate | 135 Main St. | 24459 | $300,000 | 4 | 3 | 2001-2500 |
| [detail] | Eagon Real Estate | 24 Oak Ave | 34849 | $300,000 | 4 | 3 | 2001-2500 |
| [detail] | Eagon Real Estate | 600 Main St. | 324709 | $300,000 | 4 | 3 | 2001-2500 |
| [detail] | Eagon Real Estate | 345 Betty Rd. | 345222 | $345,000 | 4 | 4 | 2501-3000 |
| [detail] | Eagon Real Estate | 4 Oakwood Pl. | 789684 | $345,000 | 4 | 3 | 2501-3000 |
| [detail] | Eagon Real Estate | 34 Harrison St. | 12331 | $350,000 | 4 | 3 | 2501-3000 |
| [detail] | Eagon Real Estate | 9027 1010 Hwy. | 79769 | $350,000 | 4 | 3 | 2501-3000 |
| [detail] | Eagon Real Estate | 398A Kennedy | 484534 | $350,000 | 4 | 3 | 2501-3000 |
| [detail] | Eagon Real Estate | 90 N. Shoman | 45883 | $375,000 | 4 | 5 | 2501-3000 |
| [detail] | Eagon Real Estate | 307 Circle Dr. | 84534 | $375,000 | 5 | 3 | 2501-3000 |
| [detail] | Eagon Real Estate | 98 North Wood | 53783 | $375,000 | 5 | 3 | 2501-3000 |
| [detail] | Eagon Real Estate | 897 Aker Ave. | 23456 | $380,000 | 4 | 5 | 2501-3000 |
| [detail] | Eagon Real Estate | 5 Barth St. | 768694 | $390,000 | 5 | 5 | 3001-3500 |
| [detail] | Eagon Real Estate | 78 Jimmy Ave. | 452354 | $400,000 | 5 | 6 | 3001-3500 |
| [detail] | Eagon Real Estate | 3287 A Ave. | 70790 | $475,000 | 4 | 6 | 3501-4000 |
| [detail] | Eagon Real Estate | 8 Wealt St. | 234111 | $500,000 | 4 | 3 | 4001-4500 |
| [detail] | Eagon Real Estate | 57 Monroe St. | 43275 | $500,000 | 5 | 7 | 4001-4500 |

☐ Done

☐ EASy - New Rental Form — Microsoft Internet Explorer    ▁ ▢ ⊠

File   Edit   View   Favorites   Tools   Help

New Rental Form
[Required fields appear in red.]

Listing Agent: Diana Eagon    Company: Eagon Real Estate    Market: Greenville, SC
Company MLS SID # boom99   Personnal MSLID# 8   Listing ML SID # [____]  ← 603

Owner's Information
The following information will not appear on the listing web page. It will only be used for production of the owner's letter report.

Owner's First Name: [_____]    Last Name: [_____]
Rental Address: [_____]    PO or Rt.: [_____]  ← 605
City: [_____]    County: [_____]
State: [__]    Zip: [_____]

Directions:
[_____]

Listing Expiration Date [_____]    Listing Warning Date [_____]
(i.e. 12/31/99)    (i.e. 12/31/99)

Photo Information    ○ Photo Needed -Please Take a Picture!    ● I already have a photo  ← 607

Please indicate How You'll Send It or if EASy has it:

Shoot Date:
[08-11-2003]    [-select-  ▽]

Our staff will follow the directions you listed in the direction box above!

Cont. from Fig. 24A

Listing Ad Copy. [Enter text as you would like it to appear in your ads]

_609_

105 characters only!!

Real Estate Information
The following information will be used on your listing web page only.

Rent: ☐   Term of Lease: ☐   — 611
Deposit: ☐   Date available: ☐

Are Pets Allowed? (required): ○ Yes  ◉ No

Pet deposit: ☐   Pet rules: ☐   — 613
Special Limitations ☐
Total occupants allowed: ☐

Eat-in Kitchen: ○Yes◉No; Ceiling fans: ○Yes◉No;
Air Conditioning: entra;: ○Yes◉No; Room AC: ○Yes◉No;
Drapes: ○Yes◉No;  Refrigerator: ○Yes◉No;
Range: ○Yes◉No; Dishwasher: ○Yes◉No;
Disposal: ○Yes◉No; Fenced: ○Yes◉No;    — 615
Patio: ○Yes◉No; Fireplace: ○Yes◉No;
Washer dryer connection: ○Yes◉No; Carport: ○Yes◉No
Year Built: ☐

Is this property currently rented? ○Yes◉No
[If you check Yes it will not show up in the consumer search, but if you check No the property will show up in the consumer search.]

Number of Rooms: ☐   Number of Bedrooms: ☐
Number of Full Baths: ☐   Number of Half Baths: ☐
Dining Room Info: ☐   — 617
Basement: ☐   Garage: ☐
Heating: ☐   Flooring: ☐
Total Sq ft: 0 ▽

Cont. from Fig. 24B

Room Sizes

Livingroom: [ ]   Dining Room: [ ]
Kitchen: [ ]   Family Room: [ ]   Rec Room: [ ]
Den: [ ]   Utility: [ ]
Master Bedroom: [ ]   Bedroom 2: [ ]   Bedroom 3: [ ]
Bedroom 4: [ ]   Bedroom 5: [ ]

} 617

Lot and Legal Information

MLS Area: [ ]   Subdivision: [ ]
Lot Size Front: [ ]   Lot Size Back: [ ]
Lot Size Left: [ ]   Lot Size Right: [ ]
Acres: [ ]   Water: [ ]   Sewer: [ ]   Roof: [ ]   Walls: [ ]
Windows: [ ]   Appliances: [ ]   Outside: [ ]   Interior: [ ]
Elementary School: [ -- Select School -- ▽ ]
Jr/Middle School: [ -- Select School -- ▽ ]   } 619
Senior High School: [ -- Select School -- ▽ ]

This information will only be seen on your listing webpage, not in your ad.
Remarks: [                    ] 621

[ Submit Listing to Database ] — 623
☐ Done

Create an Ad for Rentals — Microsoft Internet Explorer

File  Edit  View  Favorites  Tools  Help

Create An Ad for Rentals

Here is your current electronic advertising information:
Grant Eagon - broker
Grant Eagon Real Estate
MLS: gre
Fayetteville, NC
Your Header Information for your Advertisement:
◉ Header/border Remains the Same     ○ Header/border Changes
Please type all header/border changes or changes to the ad below:

```
              602
```

Would you like to send a picture of yourself or a listing?
Mail your picture to: ←
                         ⤴ 604

Fayetteville North Carolina
Real Estate Preview
2915 Raeford Road Suite 100
Fayetteville, NC 28303
Or attach your photo and e-mail it by clicking here Select the Upcoming Issue and Street Date for your Ad:   ⟋ 606
| Choose your Volume/Issue                              ▽ |

Personal Rentals: 17          Number of Rentals you will
                              be advertising this issue:
                                                         ⟋ 608
Company Rentals: 24           [      ]
                                (Required)

┌─────────────────────────────────────────────────────┐
│ ☐ Untitled — Microsoft Internet Explorer    _ ☐ ☒ │
├─────────────────────────────────────────────────────┤
│ File  Edit  View  Favorites  Tools  Help            │
├─────────────────────────────────────────────────────┤

Grant Eagon
111 My Street,,
Fayetteville NC 28303
Phone: 910-423-2213
Toll-Free:
Fax: 910-423-3333
grant@easyads.net
Grant Eagon Real Estate
MLS: (gre)
Real Estate Market: Fayetteville, NC Here are your advertising specs:

Issue: Fayetteville Real Estate Preview
Street Date: 23-Sep-03
Due Date: 10-Sep-03           Select the Homes You Wish to Advertise:          614
Number of pics: 2
                                 ○ 45 - Seller: Bill Johnson Address: 113 My Street
[Please enter the Red Home         Expires: 01-Dec-01 MLS: 1234567 $: $7,065,650.00
Number indicated beside          ○ 46 - Seller: Mike Mitchell Address: 74 Peoples
your listings into the boxes       Street Expires: 01-Oct-01 MLS: 99887766 $:
below.]                            $1,000.00
You may refine the Ad Copy       ○ 47 - Seller: Tom Crumble Address: 555 High Street
Selection in the next step.        Expires: 01-Dec-01 MLS: 88665544 $: $1,200.00
                                 ○ 48 - Seller: Address: Expires: 03-Mar-03 MLS:
Position 1 Home: [    ]            1083947019 $: $350.00
Position 2 Home: [    ]          ○ 49 - Seller: Address: Expires: 01-Oct-01 MLS:
                                   5657975 $: $400.00
                  616            ○ 58 - Seller: Address: Expires: 01-Oct-01 MLS:
                                   74874587 $: $950.00
                                 ○ 62 - Seller: Address: Expires: 01-Dec-01 MLS:
                                   4758568 $: $1,100.00
                                 ○ 63 - Seller: Address: Expires: 31-Dec-01 MLS:
                                   560756076 $: $1,200.00
                                 ○ 66 - Seller: Address: Expires: 31-Dec-01 MLS:
                                   1324123 $: $350.00

618
                    [ Update Ad Copy for Homes ] [ Clear Form ]
☐ Done

Cont. from Fig. 27A

Update Your listing Ad Copy Per Home

Below is the copy that you entered for each listing when you created that listing. You may modify that copy by clicking in the copy box for each listing or you may use the same copy that you originally entered. If you choose to modify the copy, the modification will be saved and replace the original copy you entered.
REMEMBER, YOU CANNOT USE THE # OR APOSTROPHE IN YOUR AD COPY. EASY WILL DELETE THEM!
[Listing Agent's Names are Red - Check Your Listings for Errors. You may click your "back" button and choose again. EASy does not spell check your ads. Be sure you type correctly.]

Ad Position 1:46
Address: 74 Peoples Street
Listing Agent: Grant Eagon
3 Bedrooms
Price: $1,000.00
Ad Copy for 46: (Please review and edit for this ad)  — 622
DO NOT USE THE NUMBER SIGN OR APOSTROPHE!

My what a nice house!

Banner for this Home?
⦿None ○Reduced ○Sold ○New Construction ○Acreage
○Under Contract ○Price ○MLS# ○Copyblock ← 624
Click here to see this listing's info!
626

Ad Position 2:47
Address: 555 High Street Street
Listing Agent: Grant Eagon
3 Bedrooms
Price: $1,200.00
Ad Copy for 47: (Please review and edit for this ad)
DO NOT USE THE NUMBER SIGN OR APOSTROPHE!

Cont. from Fig. 27B

3 Bedrooms
Price: $1,000.00
Ad Copy for 46: (Please review and edit for this ad) — 622
DO NOT USE THE NUMBER SIGN OR APOSTROPHE!

> My what a nice house!

Banner for this Home?
◉ None  ○ Reduced  ○ Sold  ○ New Construction  ○ Acreage
○ Under Contract  ○ Price  ○ MLS#  ○ Copyblock — 624
Click here to see this listing's info!
— 626

Ad Position 2: 47
Address: 555 High Street Street
Listing Agent: Grant Eagon
3 Bedrooms
Price: $1,200.00
Ad Copy for 47: (Please review and edit for this ad)
DO NOT USE THE NUMBER SIGN OR APOSTROPHE!

> You will love this house.

Banner for this Home?
◉ None  ○ Reduced  ○ Sold  ○ New Construction  ○ Acreage
○ Under Contract  ○ Price  ○ MLS#  ○ Copyblock
Click here to see this listing's info!

[ Ad Confirmation ]  [ Clear Form ]
☐ Done
628

```
┌─────────────────────────────────────────────────────┐
│ ☐ Untitled — Microsoft Internet Explorer    _ □ ☒  │
│ File  Edit  View  Favorites  Tools  Help           │
│ ┌─────────────────────────────────────────────────┐ │
│ │ Confirmation -- Your Ad Instructions -- Rental Ad│ │
│ │                                                  │ │
│ │ Your Name: Grant Eagon                           │ │
│ │ Your Company/Broker: Grant Eagon Real Estate     │ │
│ │ MLS: (gre)                              ─632     │ │
│ │ Real Estate Market: Fayetteville, NC             │ │
│ │                                                  │ │
│ │ Billing Information: ⦿ Bill Me! ○ Bill my company│ │
│ │ If copy doesn't fit ad space: ○ Edit Copy for me ○ Reduce Font Size to Fit │ │
│ │                                                  │ │
│ │ Here are your advertising specs:                 │ │
│ │       Issue: Fayetteville Real Estate Preview    │ │
│ │       Streeet Date: 23-Sep-03                    │ │
│ │       Due Date: 10-Sep-03                        │ │
│ │       Number of pics: 2                          │ │
│ │                                                  │ │
│ │              Your Listing Ad Copy                │ │
│ │   ┌──────────────────────────────────────────┐   │ │
│ │   │ Position 1 Home: 46                      │   │ │
│ │   │ Address: 74 Peoples Street               │   │ │
│ │   │ Ad Copy: My what a nice house!           │   │ │
│ │   │ Banner: none                             │   │ │
│ │   ├──────────────────────────────────────────┤   │ │
│ │   │ Position 2 Home: 47                      │   │ │
│ │   │ Address: 555 High Street                 │   │ │
│ │   │ Ad Copy: You will love this home.        │   │ │
│ │   │ Banner: none                             │   │ │
│ │   └──────────────────────────────────────────┘   │ │
│ │                                                  │ │
│ │ ┌──────────────────────────────────────────────┐ │ │
│ │ │ I have checked this ad and I want to submit this to the publication │ │ │
│ │ └──────────────────────────────────────────────┘ │ │
│ ☐ Done                                              │
└─────────────────────────────────────────────────────┘
```

```
┌─────────────────────────────────────────────────┐
│ ☐ Untitled — Microsoft Internet Explorer  _ □ ⊠ │
│ File  Edit  View  Favorites  Tools  Help        │
```

Ad Copy and Listing Confirmation
Purchase Order
[Please Print This Page and the Format
For Faxing and For Your Records..]

Grant Eagon
Grant Eagon Real Estate
Address: 111 My Street
Fayetteville NC 28303
Phone: 910-423-2213 Toll-Free:
Fax: 910-423-3333 E-mail: grant@easyads.net
MLS: 9gre0
Real Estate Market:
Fayetteville, NC Here are your advertising specs:
- Header/Border: form.header Fayetteville Real Estate Preview
- Street Date: 23-Sep-03
- Due Date: 10-Sep-03
- Number of pics: 2
- Background: none Your Listing Ad Copy

| Position 1 Home: 46 |
| Address: 74 Peoples Street |
| Ad Copy: My what a nice house! |
| Banner: none |

| Position 2 Home: 47 |
| Address: 555 High Street |
| Ad Copy: You will love this home. |
| Banner: none |

Return to EASy TOOLBOX!

☐ Done

*Fig. 29*

METHOD AND APPARATUS FOR CREATING CUSTOM ADVERTISEMENTS

RELATED APPLICATIONS

This application claims the benefit of U.S. Provisional Application Ser. No. 60/409,452 entitled "Method and Apparatus for Creating Custom Print and Electronic Advertisements" filed on Sep. 10, 2002, the contents of which are incorporated herein by reference in its entirety.

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Numerous software programs and websites have been developed to facilitate advertisement production. U.S. Patent Application 2002/0036654 invented by Evans discloses a computerized method for a user to create an advertisement utilizing a plurality of advertising formats by using templates for selected products and creating a preview of the proposed advertisement. The Evans invention may be accessed on the World Wide Web using a browser, and the resulting advertisement may be exported to a web page, e-mail, print media, and the like. The application of Evans, however, does not disclose a fully integrated advertising system permitting a user to automatically incorporate user specified inventory details into the advertisements. The product references of Evans are stored in a database, and the user cannot generate advertisements for novel products or properties. Furthermore, the invention of Evans does not facilitate virtual tours of the products displayed. Although the invention of Evans permits the advertisement to be exported into a web page, it does not build a web page or web site.

U.S. Patent Application 2002/0065739 invented by Florance describes a system and method for collection, distribution, and use of information in connection with commercial real estate, and involves creating a web-based marketplace to facilitate buying and selling of commercial properties by producing a large-scale database containing commercial property data which can then be data mined for the desired information. The invention of Florance is quite complicated and does not facilitate individual advertisement by real estate brokers targeted to consumers.

U.S. Patent Application 2002/0035494 invented by Eckes teaches a multilevel modular database software product advertising distribution system which enables multiple businesses to operate interactively with one another using the World Wide Web. The invention therein facilitates the advertisement of real estate properties by providing information to real estate brokers and the like regarding local schools, crime, property values, etc. The invention of Eckes provides template and style standards to coordinate with a layout style chosen by a customer at a broker's facility. Artisians are utilized to produce advertisements for web pages, and the like. The invention of Eckes requires the aid of programmers and artisians to generate web page advertisements, does not facilitate the use of virtual tours, and is unnecessarily complicated for the end user as compared to the present invention.

Communication between software applications and computers remotely over the Internet are well known. U.S. Pat. No. 6,125,384 issued to Brandt shows a computer apparatus and method for communication between software applications and computers on the World Wide Web. U.S. Pat. No. 5,721,908 issued to Lagarde discloses a computer network for World Wide Web server data access over the Internet.

Furthermore, numerous methods for generating web pages exist in the prior art. U.S. Patent Application 2002/0049788, applied for by Lipkin, describes a method and apparatus for generating web content by providing a web page generation engine. U.S. Pat. Nos. 6,247,032 and 6,308,188 issued to Bernardo discloses a software tool for simplifying the creation of Web sites. U.S. Pat. No. 5,968,119 issued to Stedman discloses a method of accessing information from a remote host computer to a client computer via the Internet to generate web pages.

It is know to use computerized templates to generate printed pages. U.S. Pat. No. 5,963,968 issued to Warmus describes an apparatus and method for controlling an "electronic press" to print fixed/variable information, which utilizes templates to generate pages for printing via electronic printers. It is also known to utilizes templates over the web, with on-site computers, to generate magazines and the like. Quark (trademark) provides software, such as Xflow (trademark) 1.01, which may be utilized for publishing applications on Mac OS (trademark) platforms.

Additional related art exists to facilitate business searches and transactions utilizing computers and the Internet. U.S. Pat. No. 5,913,210 issued to Call discloses a method and apparatus for disseminating product information via the internet by linking universal product codes thereby facilitating product research on the internet, which method and apparatus illustrates the use of the internet for sales information. U.S. Pat. No. 5,963,925 issued to Kolling describes an electronic statement presentment system that allows a biller to direct a statement or invoice electronically to a consumer, which uses a template to generate the statement/invoice. U.S. Pat. Nos. 5,897,260 and 5,813,348 issued to Zingher illustrate print job allocation systems that are interconnected with user computers and printers over a network. U.S. Pat. No. 5,835,712 issued to DuFresne illustrates a client-server system using embedded hypertext tags for application and database development. U.S. Pat. No. 5,832,530 issued to Paknad discloses a method and apparatus for identifying words described in a portable electronic document.

None of the above inventions and patents, taken either singularly or in combination, is seen to describe the instant invention as claimed.

SUMMARY OF THE INVENTION

The present invention allows a host company, such as an advertising company, to create a seamless integration between a user such as a realtor and a publication of the user's marketing materials in various paper and electronic forms. An embodiment of the present invention involves communication between a software application resident on a host computer (controlled by the host company) and a remote user's computer via a network. The present invention relates to a method for creating custom advertisements that preferably uses a computerized method for entering data one time via the Internet to create a database per user and user's company, which also permits generation of an inventory sales information database. The user's company is allowed to choose to connect all associates within their organization as separate users or to choose a single user name for the entire entity.

Each associate user's data is automatically populated to all other associate user's data. The method of the present invention is used to create an advertisement and/or website by displaying multiple advertising formats for selection by the user. Templates are displayed which correspond to a selected advertisement format. A preview of the selected advertisement is presented to the user in the form of an advertisement or website proof. All advertising data is recorded to be used in a plurality of formatted reporting systems to the user's client base and associates as well as providing a record-keeping system of all advertisements placed per media (print, web, etc.).

The final advertisements may be submitted directly to the appropriate vendor for printing. A transaction activity report may be displayed to the user, and a current balance report for accounting purposes may also be displayed. Furthermore indexes and displays of Internet data feed information are facilitated. Tools to populate preformatted fields, test and formulas allow users to supply data selected features, which allow the tool to be customized without the user writing any code. The tool automatically calls on the database to display features associated with the user that the user has requested to be displayed. The tool also allows users to add additional custom features to give the tool a plurality of options based simply upon the needs of the user. Analyses and index tool use and other data use may also be displayed. The tool generates client contact from targeted product and placement distribution and records client contact data for indexes and searching.

An aspect of the present invention is that it permits a user to enter data about an inventory listing once and then use the data entered for a myriad of purposes. The data may be used to create a magazine or newspaper advertisement, a printed brochure, an electronic brochure, and an interactive advertisement website. Different formats and colors may be selected for the advertisements and brochures. Additionally, the user may e-mail the electronic brochure to potential customers.

Yet another aspect of the present invention is that it permits the user to upload virtual tours to their website directly without having the virtual tours linked. The virtual tours are hosted on the same server, and may then be posted to the user's web site and/or e-mailed to potential customers.

Another aspect of the present invention is that it facilitates the creation of a user's monthly advertising report for all media used. Also, an advertising activity report may be created. The advertising activity report may be created by listing and by media.

An additional aspect of the present invention is that the present invention permits the user to generate a personal web site utilizing different template designs. Furthermore, the present invention permits the creation of a web page, for example in the real estate market, for each of the user's listings, links that listing web page and the user's personal web site to a local open house site and to other sellers' website, and to their broker's website.

Further aspects of the present invention include the assurance that the most current version of the software is being used since the program is web based and may be updated daily thereby avoiding the need to reload new software periodically. Error messages generated during remote use of the software program may be pasted into a Word (trademark) program and e-mailed to the software program host by clicking on a "feedback" link provided on a personal administration page.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIG. 8A is a screen shot of a "new agent entry form" page according to the present invention.

FIG. 8B is a screen shot of an "add e-mail alias page" according to the present invention.

FIG. 8C is a screen shot of an "additional e-mail control" page according to the present invention.

FIGS. 9A, 9B and 9C are screen shots of a "new listing form" page according to the present invention.

FIG. 10 is a screen shot of a "listing inventory" page according to the present invention.

FIG. 11 is a screen shot of a "data entered" page according to the present invention.

FIGS. 12A and 12B are a screen shot of an "update listing" page according to the present invention.

FIG. 13A is a screen shot of a delete page according to the present invention.

FIGS. 15A and 15B are screen shots of a "create an ad" page according to the present invention.

FIGS. 16A and 16B are screen shots of an "inventory selection" page according to the present invention.

FIGS. 17A and 17B are screen shots of a "create your ad copy" page according to the present invention.

FIG. 18 is a screen shot of a "confirmation-ad instructions" page according to the present invention.

FIG. 19 is a screen shot of an "ad copy and listing confirmation purchase order" page according to the present invention.

FIGS. 22A, 22B, 22C and 22D are screen shots of an "add body to your page" page according to the present invention.

Figures 23A, 23B:
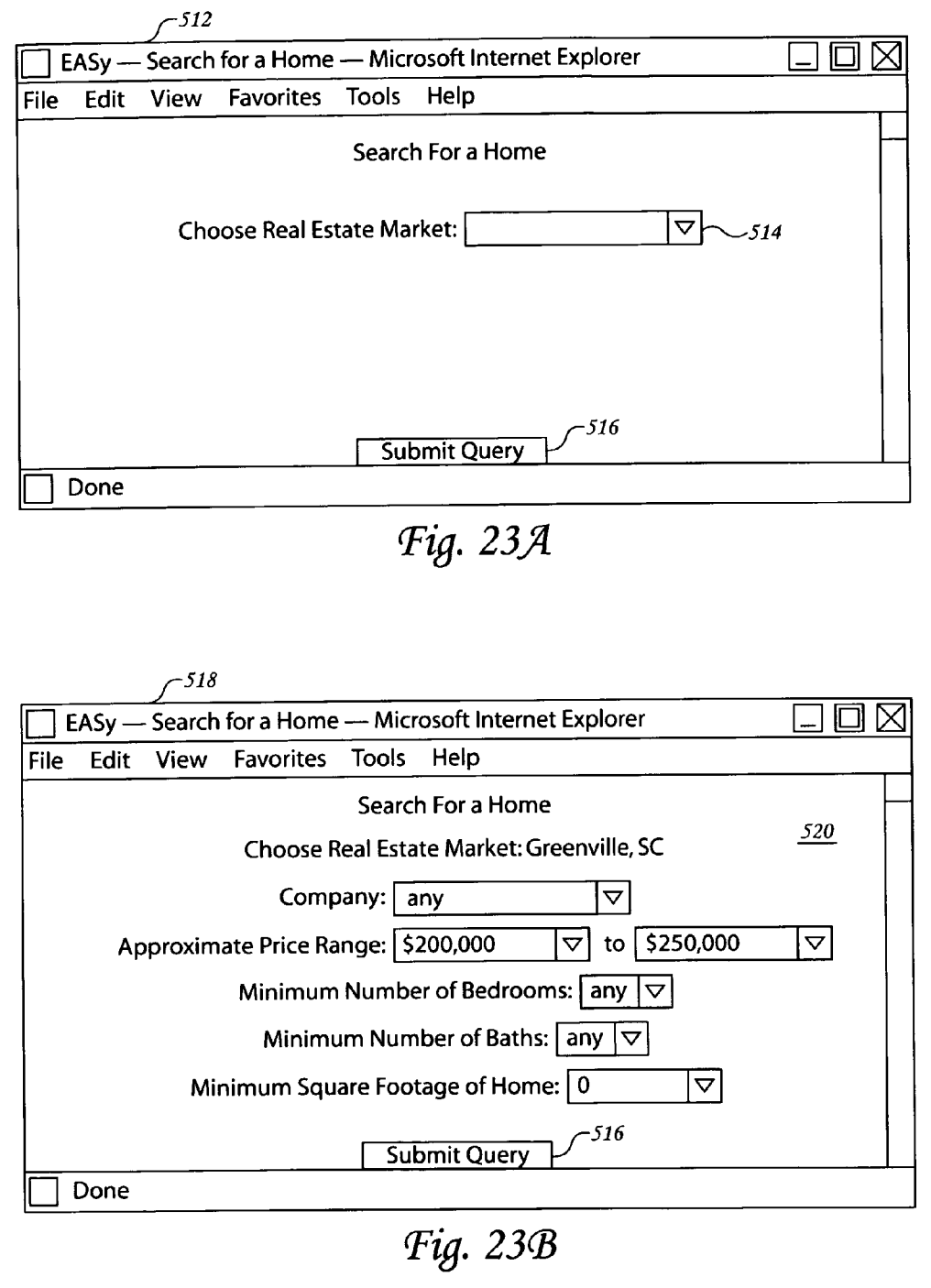

FIG. 23A is a screen shot of an initial search page according to the present invention.

FIG. 23B is a screen shot of a second search page according to the present invention.

FIG. 23C is a screen shot of a first search results page according to the present invention.

FIGS. 24A, 24B and 24C are screen shots of a "new rental form" page according to an embodiment of the present invention.

FIGS. 25A and 25B are screen shots of a "create an ad for rentals" page according to an embodiment of the present invention.

FIG. 26 is a screen shot of a rental information page according to an embodiment of the present invention.

FIGS. 27A, 27B and 27C are screen shots of a "create your ad copy" page according to an embodiment of the present invention.

FIG. 28 is a screen shot of a confirmation page for rental advertisements according to an embodiment of the present invention.

FIG. 29 is a screen shot of an "ad copy and listing confirmation purchase order" page according to an embodiment of the present invention.

Similar reference characters denote corresponding features consistently throughout the attached drawings.

DETAILED DESCRIPTION OF PREFERRED EMBODIMENTS

Figure 1:
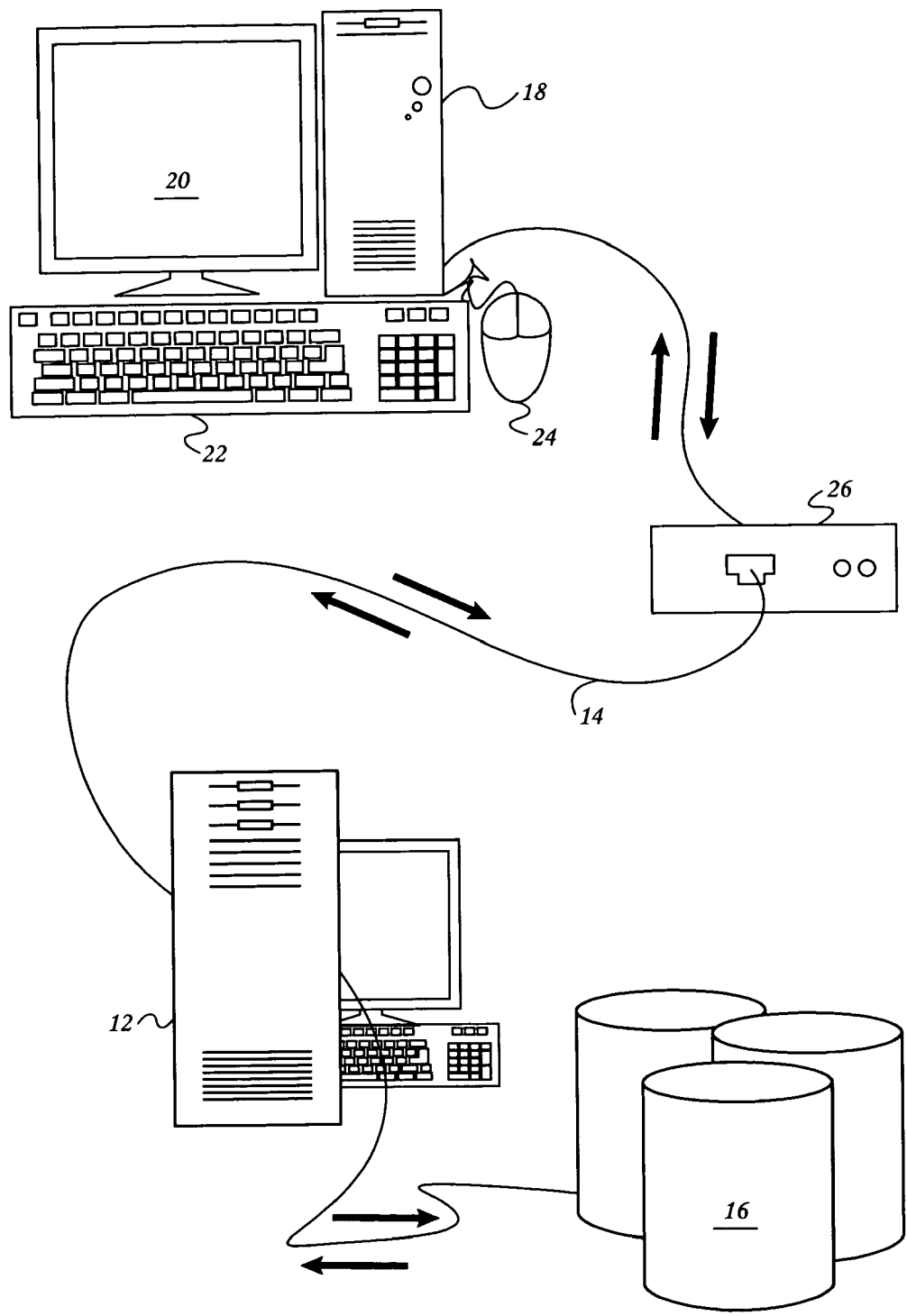
FIG. 1 shows an overall system architecture of the present invention, according to one embodiment of the present invention.

A hardware set up of the present invention is graphically represented in FIG. 1. The present invention may use a software program residing in a memory device on a host server 12, which is optionally connected to a network 14. The host server 12 has a memory, a central processing unit (cpu), and a storage device. The storage device, typically a hard drive, contains the program and may also store a user database, a template database and an e-mail database. Alternatively, separate memory devices may reside on a separate database server 16 (or on separate servers), and may be used to store the e-mail database, the template database and/or the user database. The network 14, which the host server 12 may be connected to, includes a global network (the world wide web), a wide area network and a local network. A database schema according to the present invention is presented in the Appendix.

A user accesses the software program over the network 14 using a remote computer 18 connected to the network 14. The remote computer has input and output devices which may include a monitor 20, a keyboard 22 and a pointing device 24 such as a mouse, and may be a standard laptop or desktop computer. The only software the remote computer 18 needs to utilize the present invention is a web browser, such as Microsoft's (trademark) Internet Explorer, to access the host server 12. Alternatively, the remote computer 18 may be connected to a remote server 26, which in turn is connected to the network 14, as shown in FIG. 1. A plurality of user remote computers 18 may access the software program at the same time through the same or separate remote server(s) 26. A plurality of remote computers may be connected to a plurality of remote servers that are connected to the network 14. A plurality of separate remote computers may be connected directly to the network 14 as well. The user's customers may also access the host computer(s) remotely over the internet to view, but not modify, web pages hosted on the host computer(s).

Although a plurality of users and user's customers may access the software program over any type of network 14 at the same time, the present invention will be described by the example of a single user connecting to the host server 12 through a single remote computer 18 over the global computer network 14. It is to be understood that the software program residing on the host server 12 may have each database 16 accessed by the software program residing on different servers. The host server 12 may be accessed through different networks 14 and through intermediary computers over the network or through a remote server 26 to which the user's remote computer 18 is connected to the network 14. Various hardware configurations will be well understood by an artisan of ordinary skill in order to practice the present invention over differing network arrangements.

Furthermore, the present invention shall be described by the example of real estate marketing wherein the inventory for sale is real estate, the user companies are brokers, the users are agents (employees or associates of brokers), and customers or clients (are persons in the market for real estate purchases). The scope of the present invention, however, is seen to incorporate sales of any kind of inventory, including natural products and retail merchandise. Market sales may incorporate any type of region or market specific sales practices as is well known in the art of sales.

Figure 2:
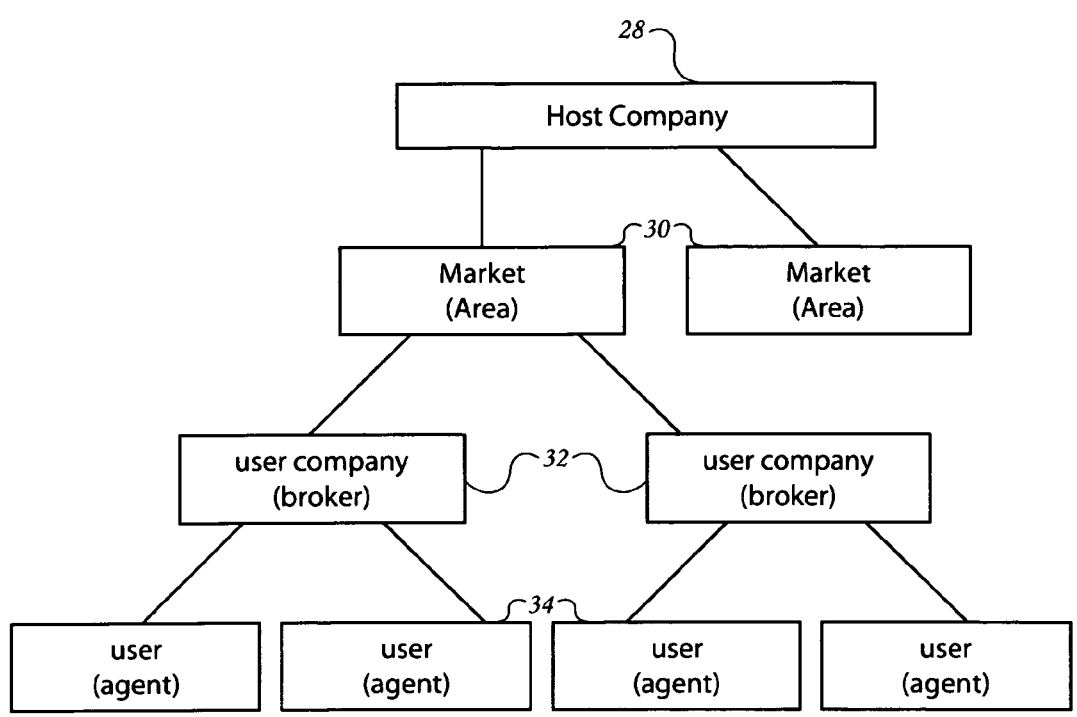
FIG. 2 is a diagram demonstrating an arrangement of websites and databases on the host server, according to the present invention.

FIG. 2 is a diagram demonstrating an arrangement of websites and databases on the host server, according to the present invention. All databases and websites utilized or generated by the present invention are resident at the host company 28. The database and website files are associated in a market specific area 30 so that all inventory listings are available for access within that market area. The websites of all user companies 32, such as brokers, are segregated under their market area 32 where the bulk of business for each user company 32 is located. The websites for each user 34 (agent or employee of the user company) is segregated under their associated user company 32. This arrangement permits all user companies (brokers) and users agents within a designated market area to access inventory listings from within that area. This arrangement also permits all users within a user company access to all other data, including non-inventory data, within that user company's control. Various access rights may restrict the privileges of each user within a user company and an administrator user may be assigned control of user privileges within the company's area.

Figure 3:
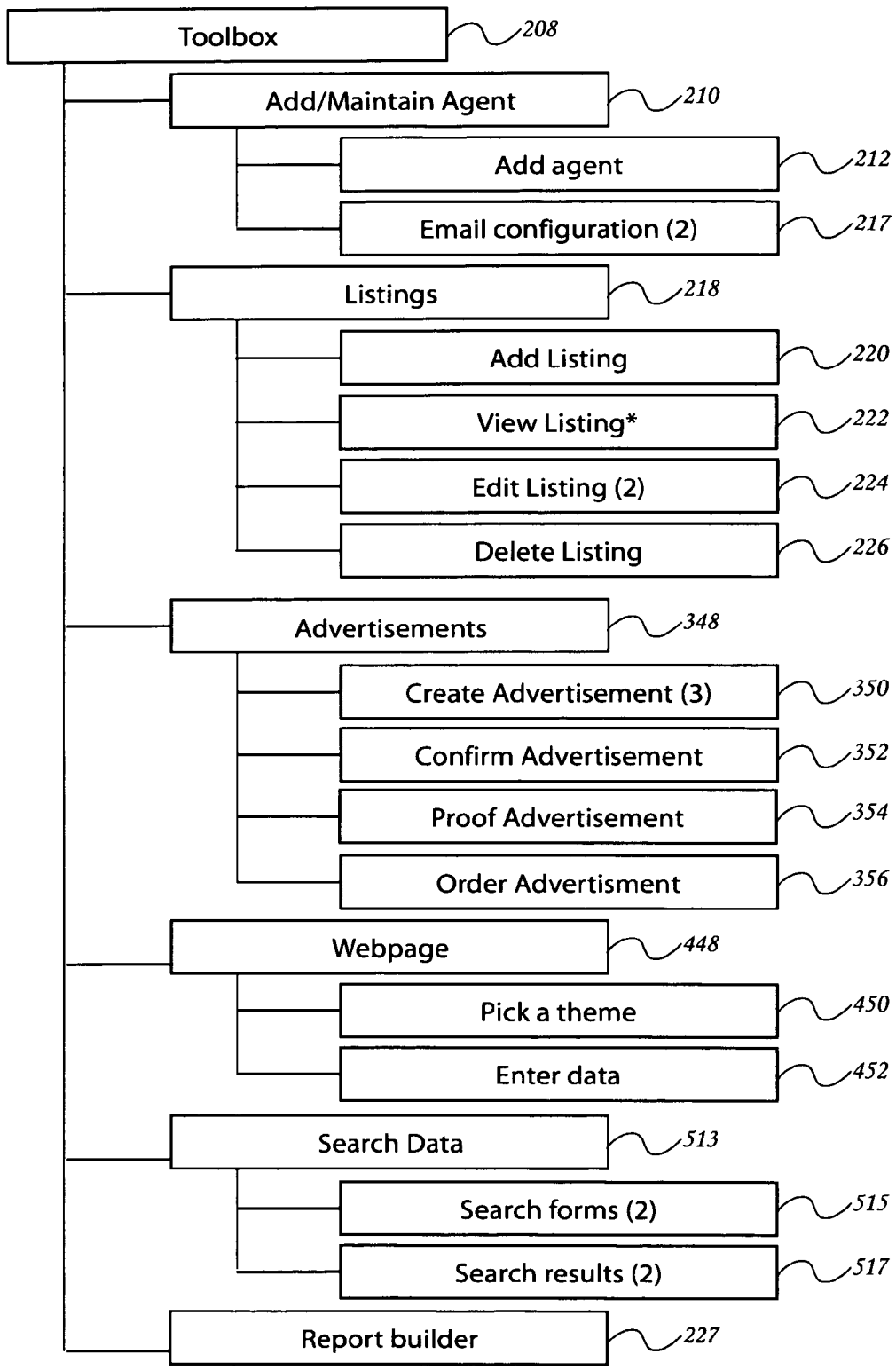
FIG. 3. is a diagram demonstrating a toolbox arrangement of the present invention.

FIG. 3 depicts a diagram demonstrating a toolbox arrangement utilized in accordance with the present invention and discussed further hereinbelow. Specifically, the toolbox diagram shows that the present invention provides tools pertaining to adding/maintaining an agent, building an inventory listing, building advertisements, building webpages, searching data, and generating reports.

Figure 4A:
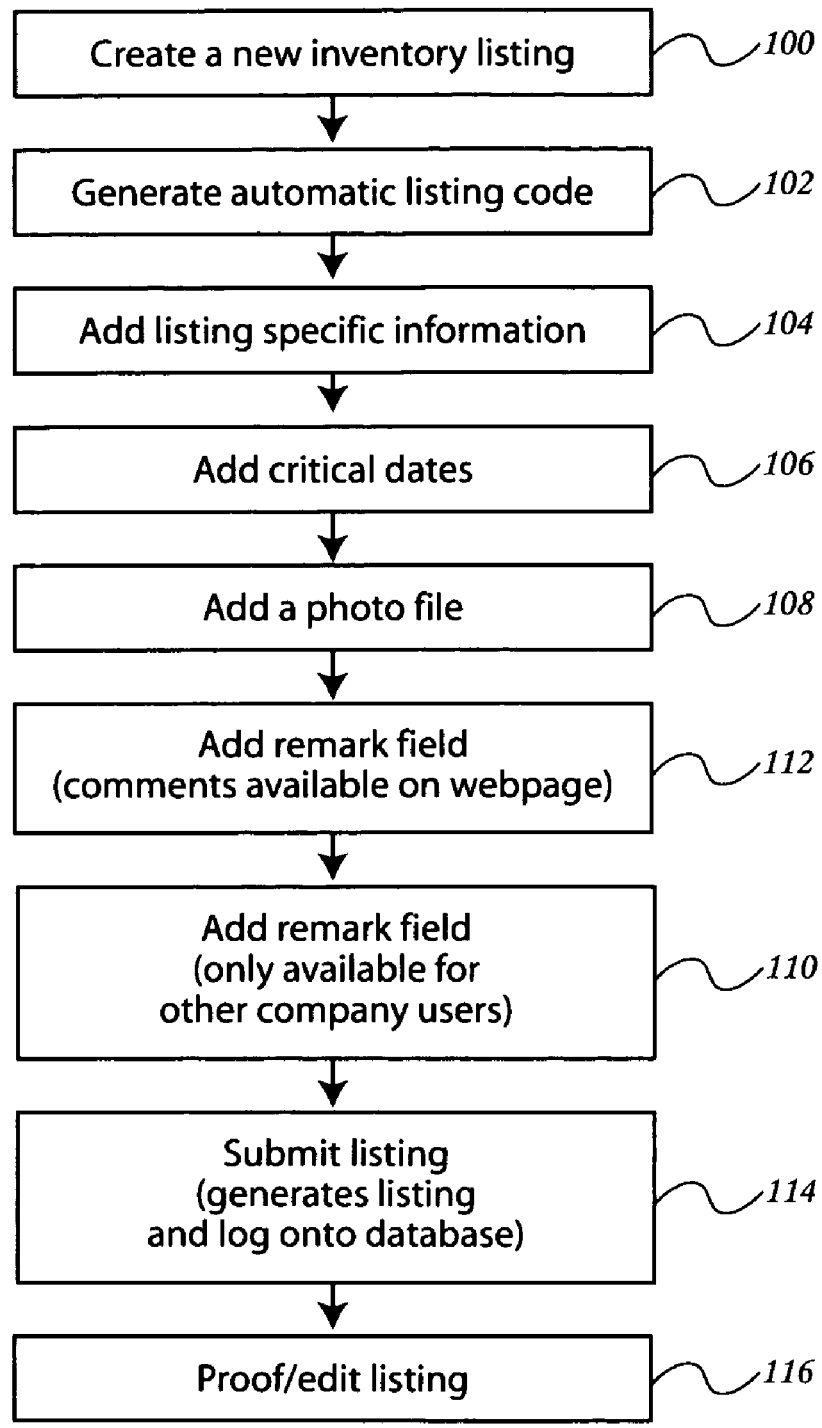
FIG. 4A is a flow chart depicting the steps of carrying out the inventory builder module of the present invention

FIG. 4A is a flow chart demonstrating the steps involved in utilizing the inventory builder of the present invention. The user remotely accesses the inventory builder over the network from the toolbox menu, to create a new inventory listing 100. The program generates a unique listing code 102 which automatically associates the property with a market area. User then adds listing specific information 104 to the fields in the inventory builder page, including demographic fields for the seller (such as name, address, and contact information), property specific information (such as location, size, price, and the like), and copy fields for print advertisements. The user then adds inventory critical dates 106 (such as a listing expiration date and warning date). The user then attaches photo files in the appropriate field(s). The user then may fill in two provided additional remarks fields 110 and 112: the first remarks field is for additional copy that will appear on a website advertisement but not in a print advertisement, and the second remarks field is for intra-company communication regarding the listing which will only be accessible by the user company's agent users. The information is the second remarks field will not be displayed on the websites or in print advertisements. The user then submits the listing 114 which generates the inventory listing and logs the inventory listing into the database under the proper market area. The user or other users within the same company having access privileges may then proof and edit the inventory listing 116, as desired. Upon resubmission of the listing the new edited version will be available for other's use.

Figure 4B:
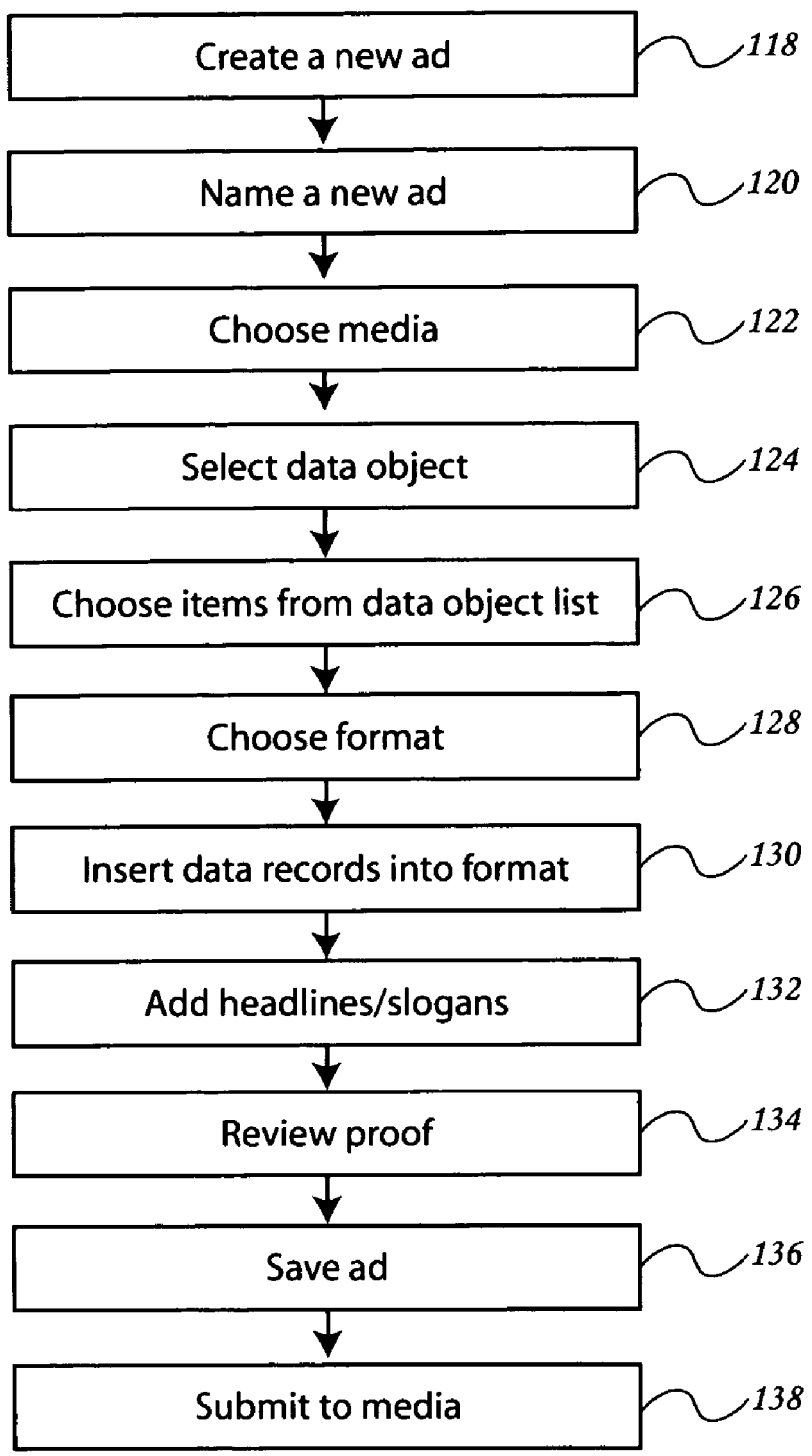
FIG. 4B is a flow chart depicting the steps of carrying out the advertisement builder module of the present invention

FIG. 4B is a flow chart demonstrating the steps involved in utilizing the advertisement builder of the present invention. The user remotely accesses the ad builder over the network from the toolbox menu. The user creates 118 and names 120 a new advertisement. The user then chooses a media outlet 122 for print advertisement purposes. The user selects data objects 124 and chooses items from the data object list 126. The user then selects the advertisement format 128, and inserts data records into the format 130. The user then adds headlines and slogans 132. The user then may review a proof 134 of the advertisement, save the advertisement 136 and submit the advertisement to the media 138 selected. Employees of the host company handle the submitted advertisements to produce a final print advertisement or magazine.

Figure 4C:
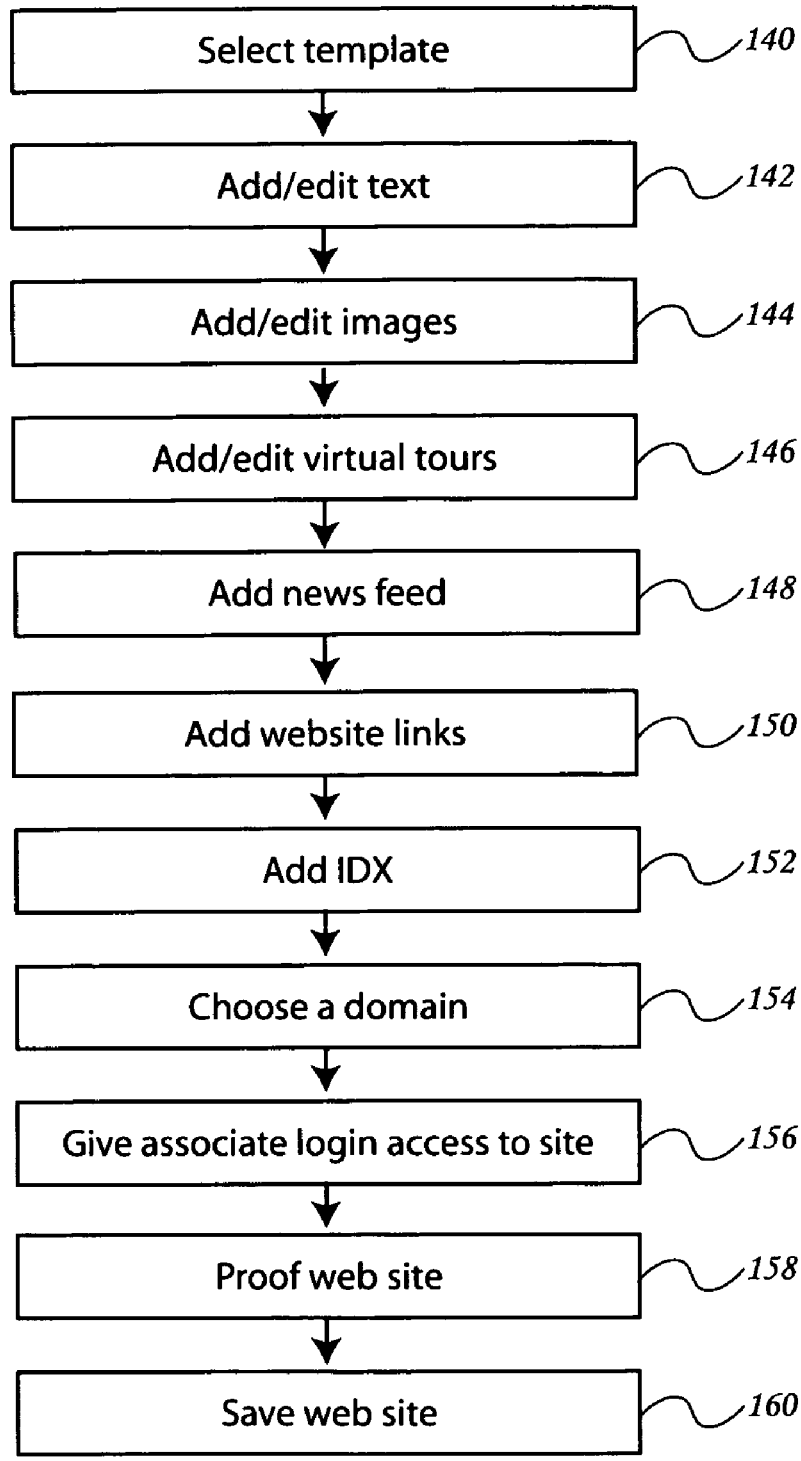
FIG. 4C is a flow chart depicting the steps of carrying out the present invention.

FIG. 4C is a flow chart depicting the steps involved in utilizing the website builder of the present invention. The user remotely accesses the website builder over a network from the toolbox menu. Initially, the user selects a website template 140 from a list of website templates. The user then adds text 142, which may also be edited, to the text fields of the template. The user then adds images 144 in the form of digitalized photographs and virtual tours 146 in the form of 360° photos. The user adds news feed 148 if they desire. Then the user adds website links 150 and IDX 152, as discussed hereinafter. The user chooses a domain name 154 for their website, and gives associate users login access to the site 156 for privileges to modify the website. The user then views a proof of the web site 158 and saves the website 160.

The inventory builder, advertisement builder, and website builder are discussed in more detail and by way of example hereinbelow. The inventory listing generated by the inventory builder is available for access throughout the market, and is inserted through selection into both the advertisement builder and the website builder as discussed further herein.

Figure 5A:
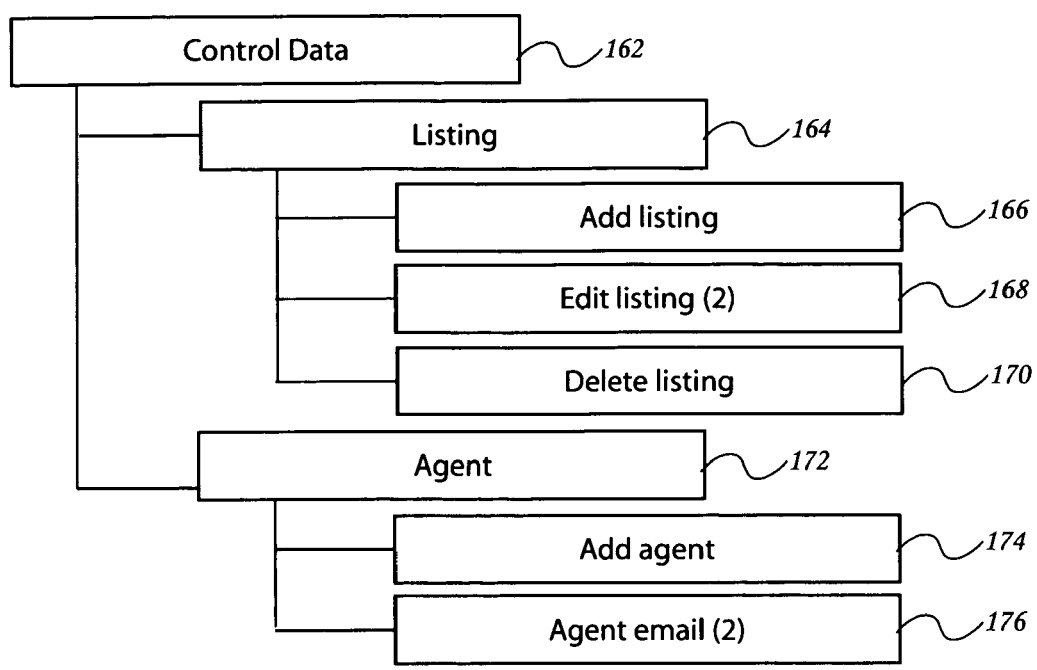
FIG. 5A is a diagram demonstrating a data arrangement of the present invention depicting control data chart.
Figure 5B:
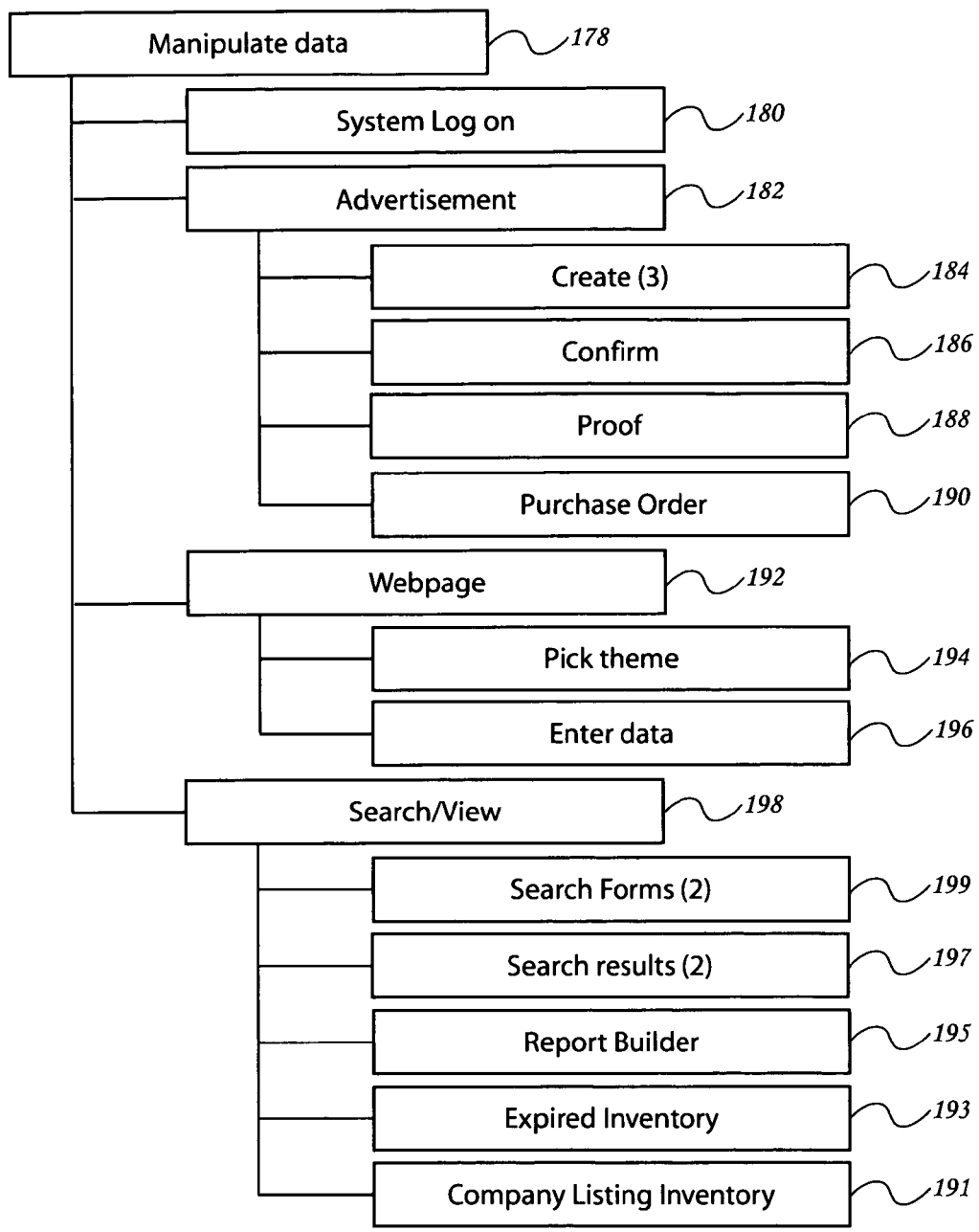
FIG. 5B is a diagram demonstrating an alternative view of the data arrangement of the present invention depicting a manipulate data chart.

FIGS. 5A and 5B demonstrate the data that is controlled and manipulated according to the present invention. FIG. 5A is a diagram representing the control data 162. The control data is organized into two basic categories: listing data 164 and agent (user) data 172. The listing data 164 is controlled through adding a listing 166, editing the listing 168, and deleting the listing 170. The listing data 166 is controlled by the agent or user who added the listing and by other users (agents or broker) within the users company provided the other users have access rights to modify the data. The agent (user) data 172 is controlled by the agent (user) and includes the agent's contact information. The agent data 172 includes adding an agent 174 and agent e-mail 176. The agent data 172 and the listing data 166 are available for manipulation and addition into both the advertisements and webpage builder programs.

FIG. 5B is a diagram representing manipulation of data 178. The manipulation of data 178 involves the system log on data 180, the advertisement builder data 182, the webpage builder data 192, and the search/view data 198. Under the advertisement data 182, manipulation of data is manifested in the create advertisement data 184, the confirmation data 186, the proof data 188 and the purchase order data 190. Under the webpage data 192, manipulation of data is manifested in the pick theme 194 and enter data 196 aspects of the webpage generation. Under the search/view data 198, the user may use search forms 199, search results 197, report builder 195, expired inventory lists 193 and company listing inventory data 191.

Figure 6:
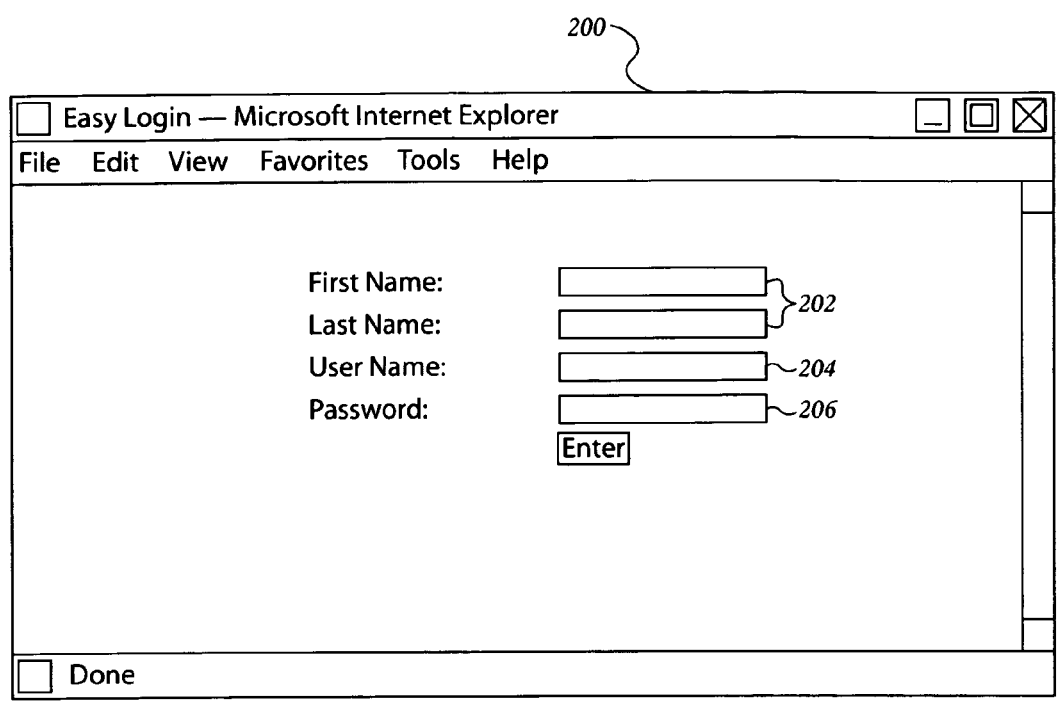
FIG. 6 is a screen shot of a login page used in accordance with the present invention.

The user accesses the software program over the global computer network utilizing a web browser residing on the user's remote computer 18. The user enters or selects the appropriate URL designation as customary for web page viewing, and a website interface window to the software program residing on the host server 12 opens. A "log in" page 200, as shown in FIG. 6, opens and the user is prompted to enter their first and last names 202, a user name 204 and a password 206. A client company may utilize a single user name and password for all of its employees thereby providing each employee with the same level of access to the software program. Alternatively, a client company may have separate user names and passwords per employee or per employee level. A client company may have various levels of user access monitored by an administrator user, or a single unmonitored level of user access. The login name and password are created in a conventional manner well known to website and software developers.

User groups consisting of a user company's employees are accorded a user company and security levels specified when the client user company is initially authorized to access the software program over the network. When the administrator creates an industry specific advertising system, a numerical security level is assigned to each group created. Higher security numbers may correspond to higher security levels. The administrator then assigns a numerical value to each security level, and then assigns a numerical value to each data object, such as inventory listings, created for that industry. The number corresponds to the security level for the user and determines what data the user is allowed to see and to manipulate. These numbers correspond to various identity codes. Identity codes are specified for each user company, each user (if applicable), each area of inventory location, and each inventory listing as will become apparent from the description herein. Access is controlled at the host server level.

Figure 7:
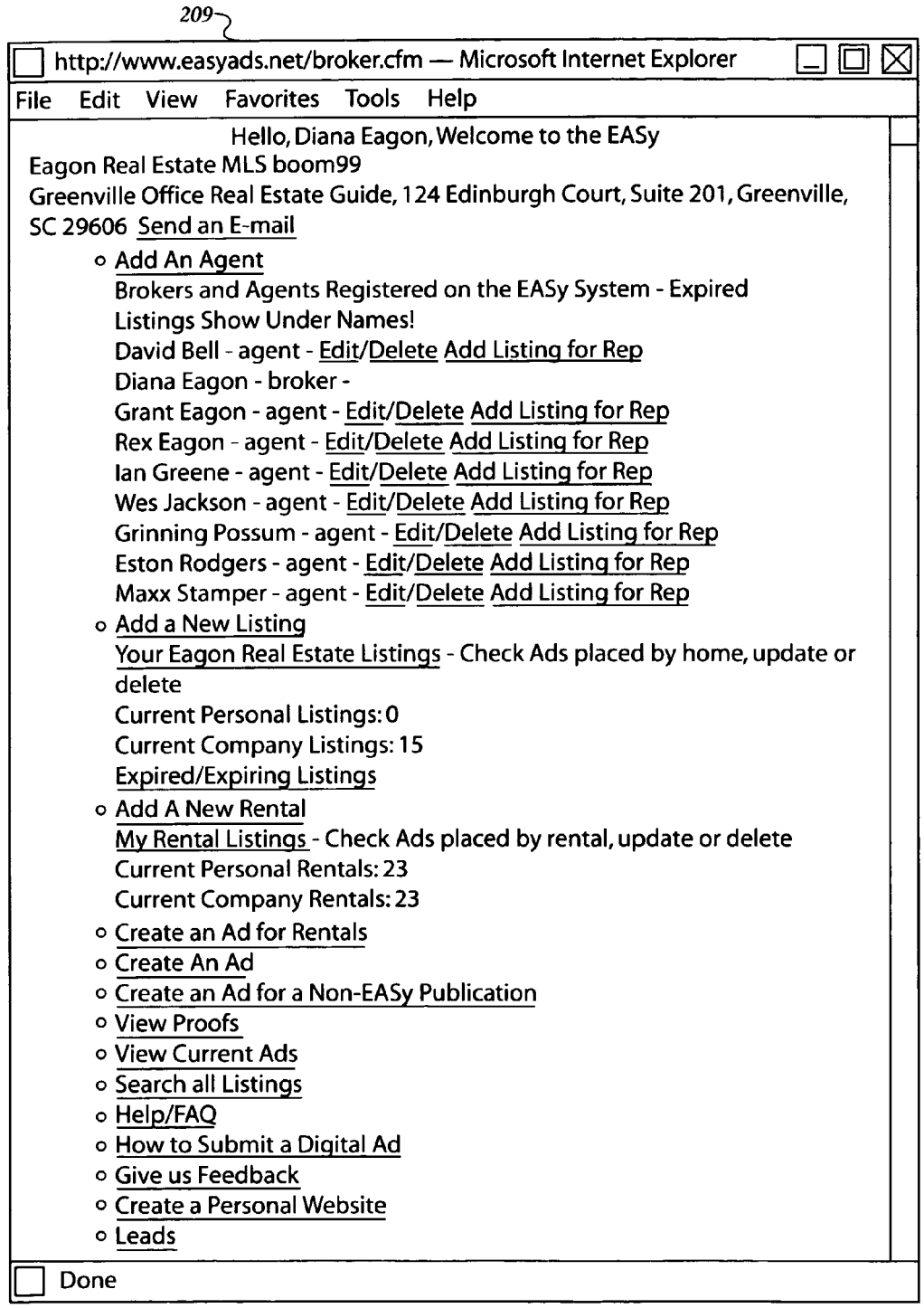
FIG. 7 is a screen shot of a user specific toolbox page according to the present invention.

In any case, when the user enters the name 202, user name 204 and password 206 in the log in page shown in FIG. 6, the user's database record is called and the user is directed to a personal administration page or toolbox 208, as shown in FIG. 7. The personal administration page or toolbox page 209 corresponds with the toolbox 208 of FIG. 3. The tools are accessible through links on the toolbox page 209. FIG. 7 is a screen shot of the toolbox page 209 as it may appear on a website. FIG. 3 is a schematic representing the toolbox 208 and its tools. The toolbox 208 includes a list of tools, which the user may access from the toolbox 208. The toolbox 208 includes links which lead to add/maintain an agent tools 210, which leads to a new agent entry form page 212, shown in FIG. 8A. The new agent entry form 212 includes numerous contact fields, including the first and last names 202, the user name 204 and a password 206. Demographics data 214 entry fields are represented which include address, phone/fax numbers, and e-mail address. The fields on the new agent entry form 212 include an identity code 216 corresponding to either the individual and/or the company user(s). The identity code for every agent of every multiple listing service (MLS) and each broker also has a unique identity code. Market designations keep the data separate per market area.

Figures 8B, 8C:
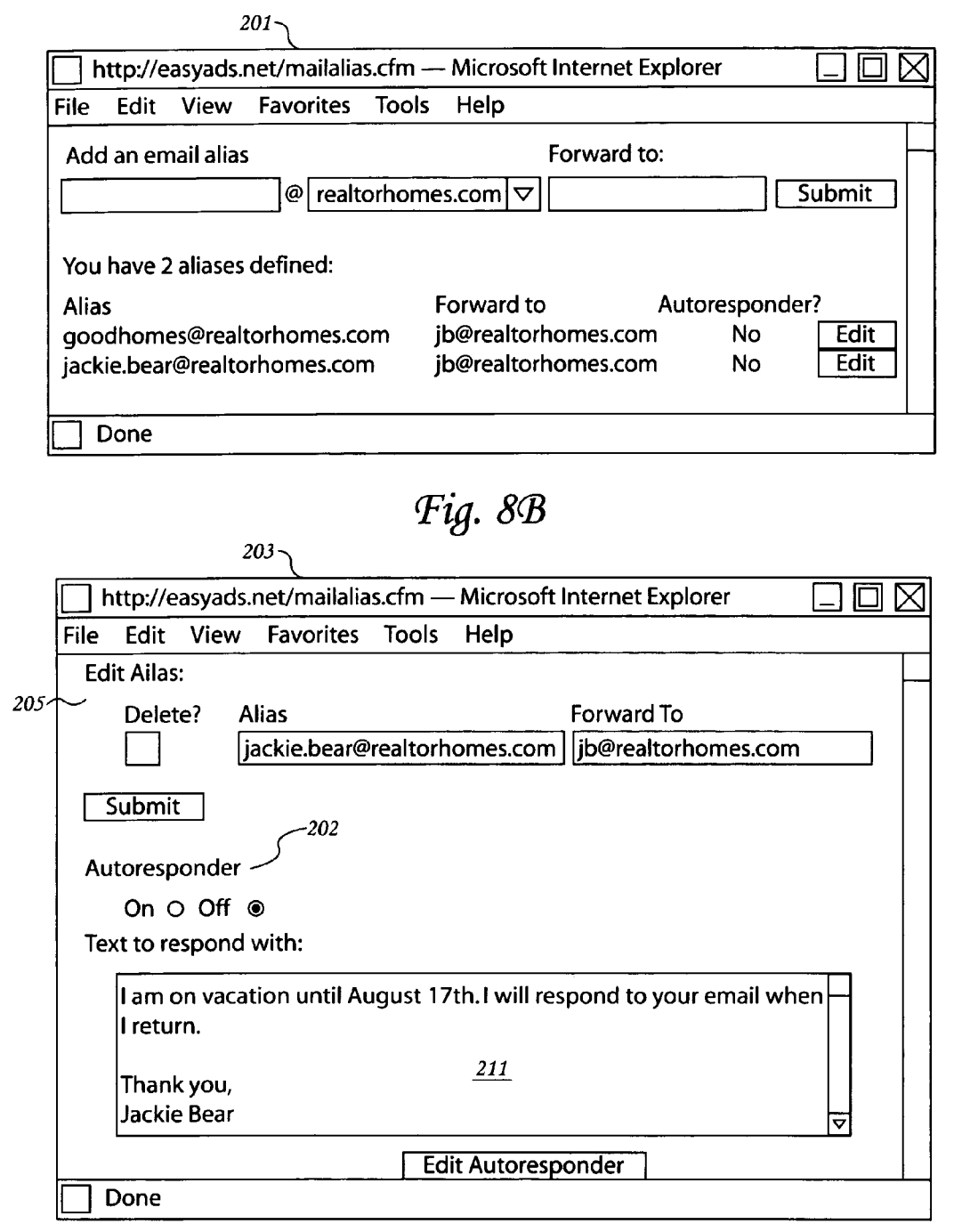

The toolbox 208 may include various e-mail options 217 including a feed back form and a "mail to" e-mail link. Also, included are additional e-mail options. FIG. 8B shows an add e-mail alias page 201 which has an add e-mail alias option which permits the user to define alias and have e-mail sent to those alias forwarded to the user's preferred e-mail box. Additionally, for the e-mail alias an additional e-mail control page 203, shown in FIG. 8C, is provided which allows the user to delete e-mail alias 205 by checking a box. An autoresponder option 207 is also provided which may be toggled on and off by clicking on the appropriate button. An autoresponse text field 211 is provided for the user to enter any text message the user wishes to have responded to any e-mail sent to the user while the autoresponder option 207 is toggled on.

The toolbox 208 further includes inventory tools 218. The inventory tools 218 may include add listing 220, view listing 222, edit listing 224 and delete listing 226. The add listing 220 includes a new listing form page 228, as shown in FIGS. 9A through 9C for sales, such as real estate sales. An add a new rental listing form for rental property analogous to the new listing form 228, such as real estate rentals, may be provided in an embodiment of the present invention discussed hereinafter, which may also include fields for term of lease and whether pets are permitted. A unique listing code 293 is provided for each inventory item and allows tracking of that item. The new listing form 228 includes demographic fields 230 for the seller such as name and address. Other fields are provided such as directions to the property 232, listing expiration date 234, listing warning date 236, photo information fields 238, property information fields 252, and comments/remarks fields, which include a comments entry field 257 for customers and a remarks entry 259 for inter-office personnel. Once the fields are completed a submit listing to database function 260 is provided wherein clicking of the function submits data entered to the database.

The photo information 238 fields include toggle buttons indicating whether a photo is needed 240 or has already been taken 242, the shoot date of the photo 244, and a drop down menu 246 indicating whether the photo has already been sent to the host company or will be sent to the host company using print, e-mail, postal service or courier options. The print and e-mail options are provided for digital or digitalized photos. A listing ad copy field 248 is provided with a classification choice list 250 or drop down menu having indications for the type of property for sale such as condos for sale, open house, Homes for sale, mobile homes for sale, farms for sale, waterfront property, lots & acreage, investment property, business property, rentals and the like. The classification choice list 250 may have indication associated with the type of property for sale which is specific to certain locals and may indicate regions where the property is located, as is well known in the property advertisement industry.

The property information fields 252 include data fields regarding the property. Such fields may be real estate information fields including price 254, number of rooms 256, number of bedrooms 258, number of full baths 260, number of half baths 262, dining room information 264, basement 266, garage 268, heating 270, flooring 272, total square feet 274, room size fields 276, and lot and legal information fields 278. The lot and legal information fields 278 may include Area designations 280, subdivision 282, dimensions of lot 284, other property demographics 286, such as total acreage, water, sewer, roof, walls, window, appliances, outside, interior, and school drop down menus 288. All text entry fields and drop down menus are generically referred to as listing specific information, accept the remarks fields 256 and 258 discussed hereinafter.

The toolbox 208 or the inventory tools 218 may provide links to a view listing 222 tool which shows a "listing inventory" page 290 that has the inventory tools 218 listed thereon for each listing, as shown in FIG. 10. The listing inventory page 290 shows a list of the data entered. The list of data entered is a list of inventory arranged by the unique listing code 293 designated after "MLS", corresponding to each property. From the list, a user may select links 292 including the links: view details, update, delete and view ads placed. Clicking on the link "view details" takes the user to a "data entered" page 294, shown in FIG. 11, which depicts the view listing tool 222. The "update" link takes the user to an update page 296 shown in FIGS. 12A and 12B which depicts the edit listing tool 224. The "delete" link takes the user to a delete page 298 shown in FIG. 13A, which depicts the delete listing tool 226. The "view ads placed" link 300 takes the user to a report generator for ads placed page 302 shown in FIG. 14. The report generator, or report builder tool 227, may also or alternatively be provided by a direct link from the toolbox page 209, shown in FIG. 3.

The data entered page 294 presents a detailed listing information page which has a detailed listing information heading 304 which identifies the listing by its unique code 293, address and price. The detailed listing is displayed under the information heading 304 in blocks indicating the user company information 306, the complete address of the property for sale 308, information regarding the number and size of rooms 310, information regarding inside attributes of the property 312, information regarding the outside of the property 314, private information 316 for view by the user, thumbnail links to photos 318 and local schools information 320. The data depicted on the data entered page 294 reflects the data entered on the new listing form 228 shown in FIGS. 9A through 9C.

An "update listing" page 296, shown in FIGS. 12A and 12B, contains fields for entering updated information complimentary to the detailed information indicated on the data entered page 294, plus additional entry fields for other data and photos. The information heading 304 is duplicated at the top of the update listing form page 296. The detailed information user company information 306 is duplicated with correctable user company form 322 for correcting or adding information to the form. Also included are the complete address of the property for sale 308 is duplicated in a correctable property address form 324 including an area code 326 for the area where the property is located, information regarding the number and size of rooms 310 is duplicated in a correctable rooms form 328, information regarding inside attributes of the property 312 is duplicated in a correctable inside attributes form 330, information regarding the outside of the property 314 is duplicated in a correctable outside form 332, private information 316 for view by the user is duplicated in a correctable private information form 334, thumbnail links to photos 318 is duplicated in a correctable photos form 338, and local schools information 320 is duplicated in a correctable schools form 336 with drop down fields for selecting from a list of local schools. The correctable forms, except for the schools form 336, have fields displaying the information entered previously which may be corrected by the user by simply adding and/or deleting information from the field. The correctable photos form 338 allows the user to add additional or replace (update) digitalized photos.

Additional forms are provided on the update listing form page 296. These additional forms include a correctable copy form 340, a correctable 360° photo form 342, and a correctable floor plans form 344. The correctable copy form 340 has a field for adding text to the listing ad copy. The correctable 360° photo form 342 has fields for adding or updating a 360° stitched together view of the property. Additional fields are provided to the correctable 360° photo form 342 for additional views of the property from a variety of locations inside and out, and during different seasons. The correctable floor plans form 344 allows the addition of various floor plans corresponding to different floors of a house or other inside structure(s) on the property. The floor plans, photos and 360° photos are added as files.

Figure 12C:
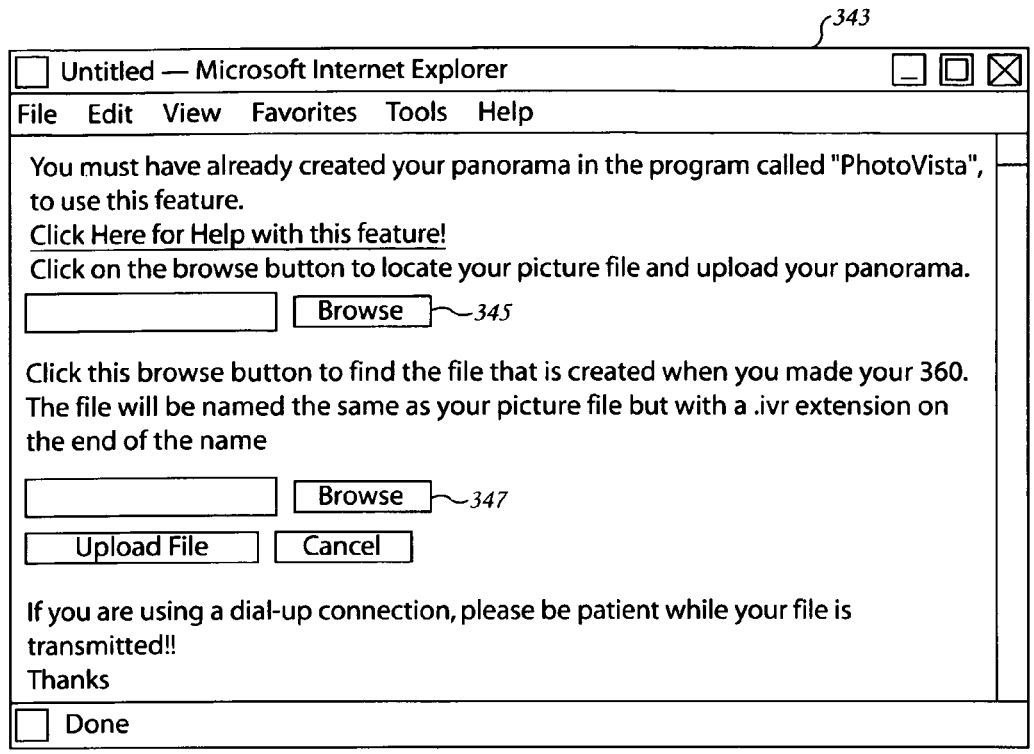
FIG. 12C is a screen shot of an "add 360° photo" page.
Figure 12D:
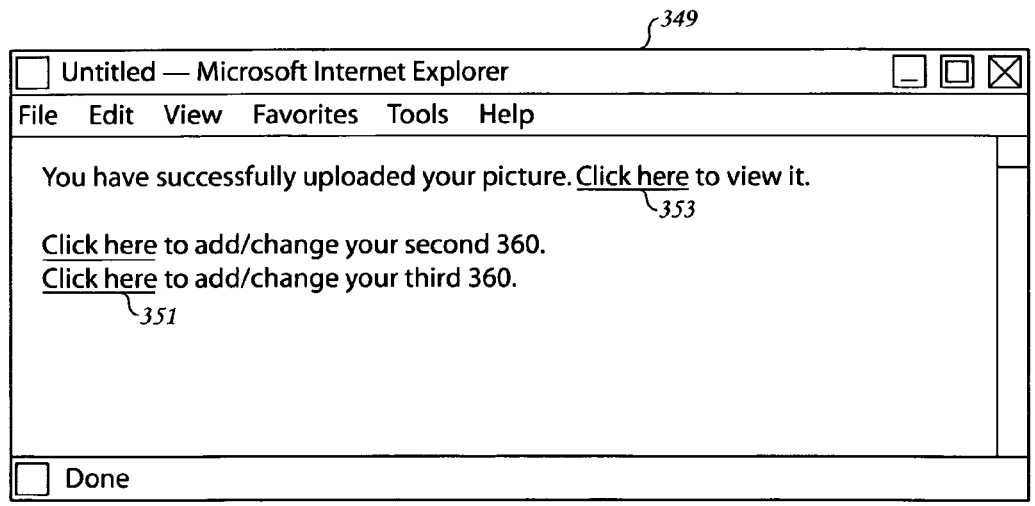
FIG. 12D is a screen shot of an "uploaded picture" page.

Adding 360° photo to the 360° photo form 342 involves entering a name for the 360° photo and adding a caption in the fields shown, and clicking on the new link which takes the user to an "add 360° photo" page 343, shown in FIG. 12C. Click on the browse for photo button 345 to add for a previously made 360° photo with a jpg extension, click on the second photo button 347 to add the same 360° photo with a ivr extension. Once both files have been loaded, select the upload file button. When complete an "uploaded picture" page 349, shown in FIG. 12D, is shown which can then be used to view, at 353, the 360° photo, to add another or to change the 360° photo, at 351.

Figure 13B:
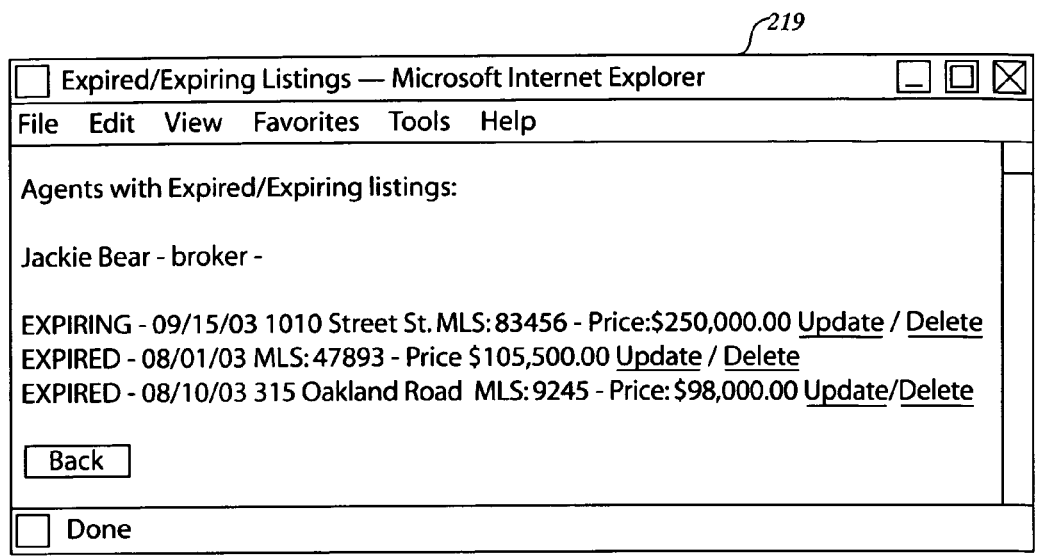
FIG. 13B is a screen shot of an expired listing page according to the present invention.
Figure 14:
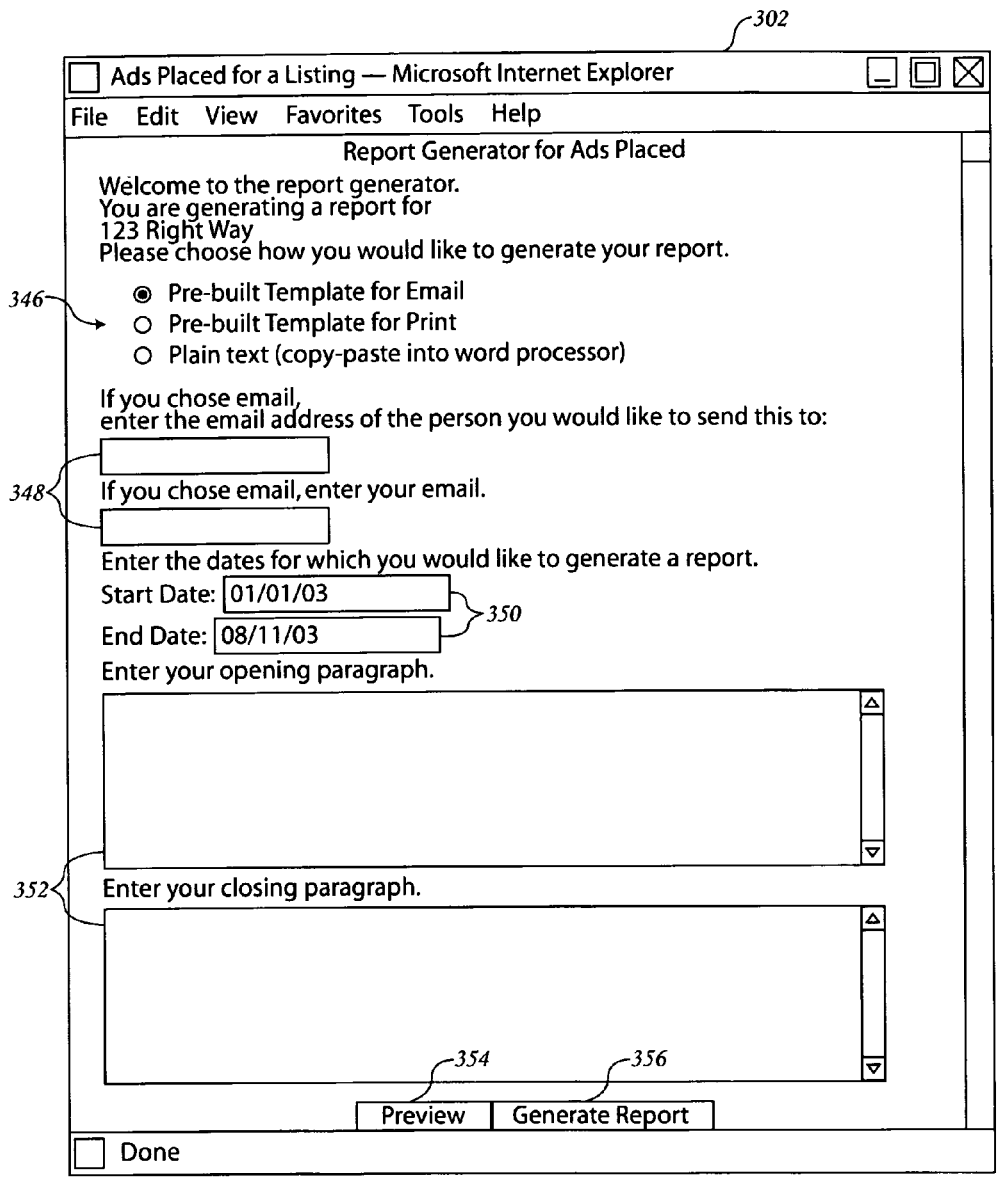
FIG. 14 is a screen shot of a "report generator for ads placed" page according to the present invention.

The delete listing tool 226 on the delete page 298 shown in FIG. 13A allows the user to keep track of deleted listings, and provides toggle buttons for why the information is to be deleted from the inventory lists. Specifically, the toggle button are associated with sold, contract expired and withdrawn. When the property is sold, the delete page 298 has fields for when the property sold, the selling price and closing comments, as shown in the FIG. 13A. This data allows the user to compile property sales and the like. Additional links may be provided from the toolbox page 209 to an expired expiring listings page 219, shown in FIG. 13B, which has a listing of expiring and expired listings.

A "report generator for ads placed" page 302, shown in FIG. 12, allows the user to generate reports based on selected formats. Preferably, the user may select pre-built template for e-mail, for print or a plain text version of the report by choosing from toggle buttons 346 shown. The report generator 302 provides e-mail address fields 348 for entering e-mail addresses for the user or a third party to whom the report should be e-mailed. The report generator 302 provides date fields 350 for specifying the start and end dates that the report should cover. Also, provided may be text fields 352 for entering an opening and closing paragraphs for the report generated thereby. A preview 354 and generate report 356 buttons are also provided to instruct the program to display a preview of the report or to generate the report according to which toggle button 346 choices were made. The report builder 227 is a tool that may also be provided from the toolbox 208.

Figure 15A:
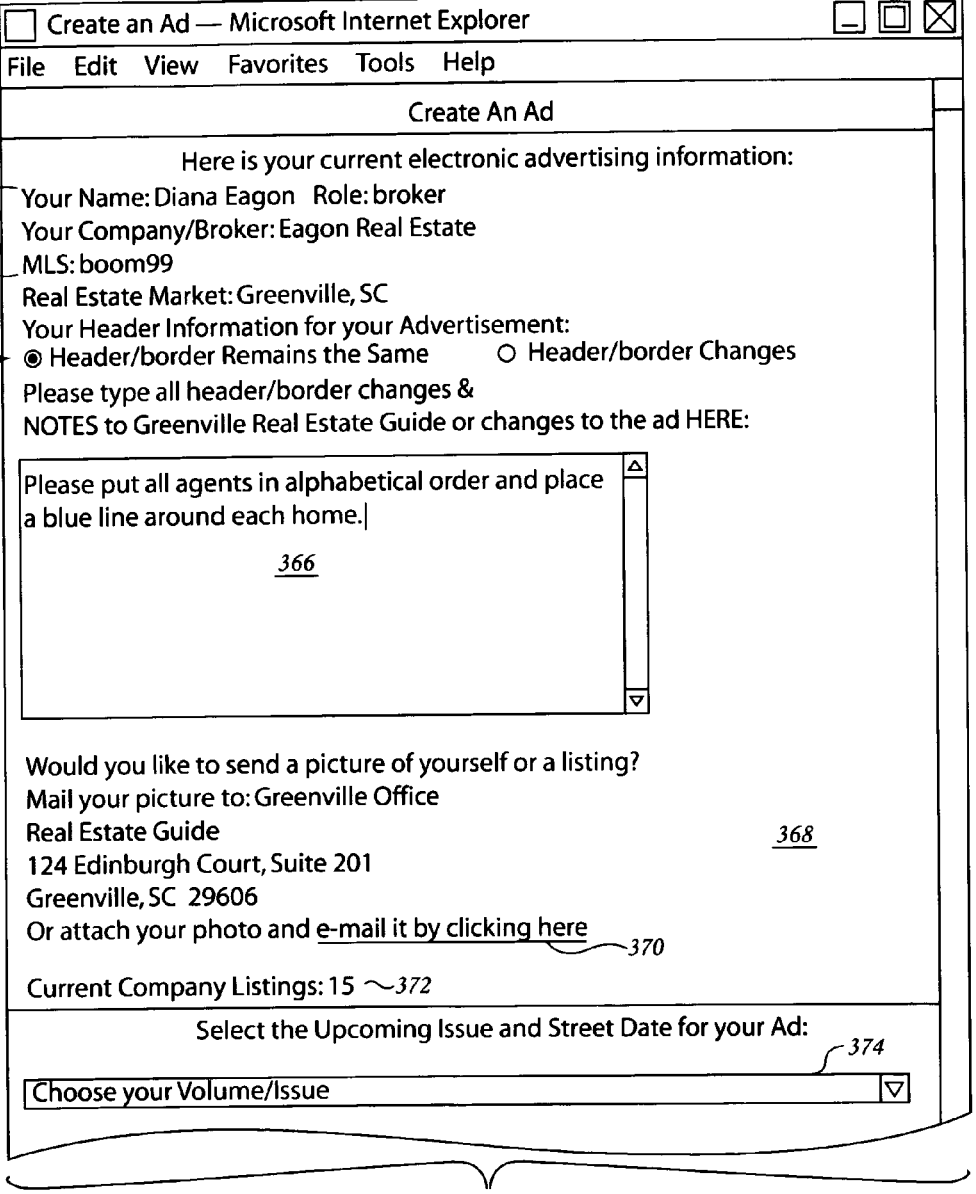

The toolbox 208 further provides an advertisements tool 348, which in turn leads to create advertisement 350, confirm advertisement 352, proof advertisement 354 and order advertisement 356 tools. The create advertisement tool 350 has a "create an ad" page 360 which is shown in FIGS. 15A and 15B. This advertisements tool 348 is designed for print advertisements, such as a real estate advertisement magazine, that the host company generates or is associated with the host company. The "create an ad" page 360 is provided as the first page in the advertisements tool 348. Electronic advertising information 362 is provided at the top of the "create an ad" page 360. The user may choose whether to change the header information by selecting header/border toggle buttons 364 where the remains the same or is changed. If the user chooses to change the header or border, the user toggles on the changes button and enters instructions for the host company staff regarding desired changes in a change add text field 366 provided for that purpose. Any other instructions to the staff are also added in the change add text field 366. The data for the print advertisement preferably goes to a copy editor and magazine staff for proper placement.

The next section of the "create an ad" page 360 is a request for adding a picture 368 of the user to the print advertisement. The address of the magazine is provided for the user to mail a picture to the magazine staff. Alternatively, a "mail to" e-mail link 370 is provided for e-mailing a digitalized picture to the magazine staff for incorporation into the magazine. Information regarding the total number of listings, at 372, are also provided on the create an ad page 360 for the user's information. A volume/issue drop down menu 374 is provided listing various volumes/issues of the magazine and the deadline date by which the advertisements must be in for the user to select. The user may then select ad formats 376, such as how much of the page and how many pictures on the page, which are displayed in a viewer box 378. The select ad formats 376 may be drop down menus beside toggle buttons which are provided to determine how many inventory items per page. The user selects the toggle button corresponding to full page, half page, quarter page, eighth page, and sixteenth page. Then the user selects the number of inventory items from the drop down menu.

Once the user has selected the number of inventory items the viewer box displays the format for the advertisement, such as 12 ads per page as demonstrated in the FIG. 15B. The user then selects the background color for the advertisement from the choose a background box 380 which contains a list of color or designs adjacent toggle buttons for the background of the advertisement. Each color or design is a link to a representative view of that selection as demonstrated in the view background box 382 adjacent the list. By clicking on the color or design, the user may preview the background in the background box 382. Once the user has decided upon the background desired, they select the color or design by clicking on the adjacent toggle button. When the user is finished with the create an ad page 360, then click on the continue to home selection and ad copy button bar at the bottom of the create an ad page 360.

The next page in the create your ad involves an "inventory selection" page 384 shown in FIGS. 16B and 16B, where the user may select the inventory to advertise. The first part of this page is the your information section which includes a user information section 386 with the user's name and contact information, including phone numbers, address, email and the like, and a company section 388 that indicates the company and real estate market designations as shown in the figures. A section regarding the advertising specifications 390 is included and an ad format section 392 which shows the chosen layout with numbers associated with each inventory specific position in the advertisement, and indicates the size and background chosen. The background chosen is indicated in a small background box 394.

Below the ad format section 392 is the inventory selection section 396. The inventory selection section 396 has an inventory list 398 indicating the inventory listings available with their associated unique codes. Adjacent the inventory list 398 is provided a position list 400 associated with the numbers associated with the chosen layout in the ad format section 392. Beside each numbered position in the position list 400 is a field for entering the unique code associated with each piece of inventory. The user enters the code in the fields in the position list 400 according to where the user wants the inventory to appear in the print advertisement. Once the user has made the appropriate selections the user clicks on the update bar 402 at the bottom of the inventory section page 384, or the user may clear the form on the inventory section page 384 and start again.

The confirmation advertisement tool 352 includes a "create your ad copy" page 404, shown in FIGS. 17A and 17B, and the confirmation-ad instructions page 416, shown in FIG. 18. The first part of the create your ad copy page 404 repeats the user information section 386 with the user's name and contact information, including phone numbers, address, email and the like, and the company section 388 that indicates the company and real estate market designations as shown in the figures. A section regarding the advertising specifications 390 is also included with the addition of a link attached to a format code 406 permitting the user to view the layout again. The next section on the create your ad copy page 404 includes an update your listing ad copy per home section 408 which includes per home per position sections 410 that lists each inventory listing per position in the advertisement. The home/position section 410 includes specifications for the inventory listing including an ad copy text entry form 412, where the user can change previously entered add copy. The user can also specify a banner for the home, as desired, by toggling the banner toggle buttons 413 which include the banner options of none, reduced, sold, new construction, acreage, under contract, price, market area designation, inventory listing designated MLS# of the listing in the database, and copyblock.

The create your ad copy page 404 provides a series of review links for proofing the layout. Links are also provided at the bottom of each home/position section 410 which allows the user to select "click here to see this listing's info" for each inventory listing per position. When the user is finished reviewing and proofing their copy they click on the ad confirmation button bar 414 at the bottom of the page. The user may choose to clear the form and redo their choices on this page.

A "confirmation-ad instructions" page 416, shown as FIG. 18, shows the final version of the advertisement information, and is used as the order advertisement tool 356. The page 416 repeats the company section 388 at the top of the page. The next section includes specific toggle choices 418 regarding billing choices, either "bill me" or bill my company, and regarding choices if the copy doesn't fit including instructions to edit copy or to reduce the font size. The advertising specifications are repeated for final confirmation in the advertising specification section 420. The next section is the listing ad copy sections 422 for each position as shown in the figure. At the bottom of the page a confirmation button bar 424 is provided which confirms that the ad has been checked and will be submitted to the publication selected.

After pushing the button bar 424, the user goes to an "ad copy and listing confirmation purchase order" page 426, which serves as a purchase order confirmation and is shown in FIG. 19. The purchase order page 426 has a user name and address section 428 at the top, the company section 388 is repeated in the net section followed by an advertising specifications section 430, as shown. The remainder of the purchase order page 426 has position/inventory listing data 432, as shown under the heading "your listing ad copy". A return to the toolbox button bar 434 is provided at the bottom of this page.

Figure 20:
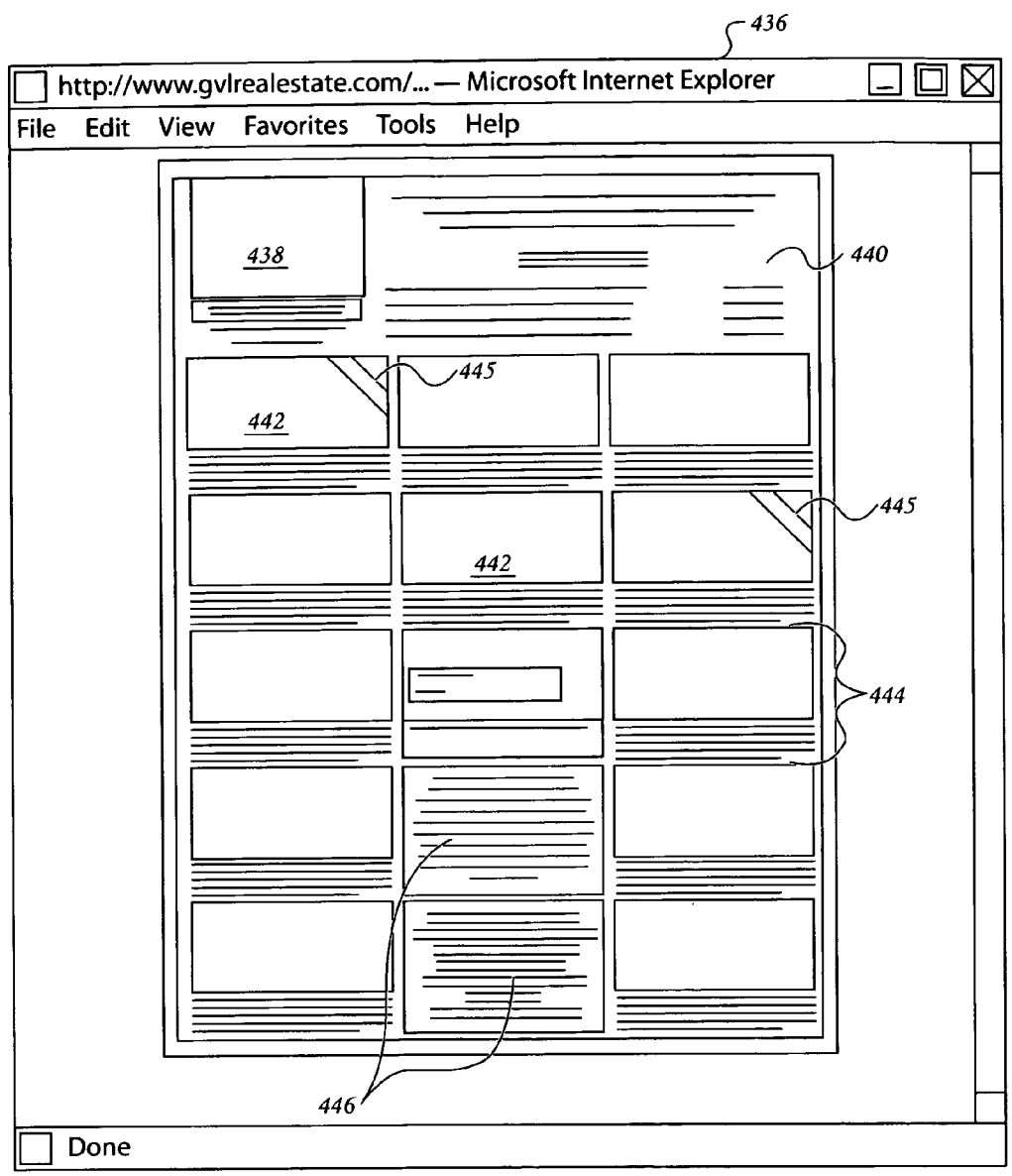
FIG. 20 is a screen shot of a proof page according to the present invention.

From the toolbox page 208, the user may select the proof advertisement tool 354. A proof page 436 is shown in FIG. 20. The picture of the user or company 438 is shown at the top of this advertisement format. Contact information 440 and advertising banners such as company name are reproduced adjacent the picture 438. Pictures of the inventory 442 are shown above the ad copy 444. Banners 445 are shown across some of the inventory pictures 442. Inventory which is sold without pictures containing only copy are shown at 446. The positions of each inventory item is placed in the appropriate position relative to its position number. The proof page 436 may be used to determine that the print advertisement has the desired appearance.

A production team of the host company handles print advertisement production. The production team has an advertisement bank in which they collect submitted advertisement that go to press. The production staff simply clicks download publication, and all templates, data and images are sent in one package to the production staff. The production staff then does a quality assurance check and final proof of the advertisement before transmitting to a presses publication pick-up folder. The press staff logs in and picks up advertisements for publication.

Figure 21:
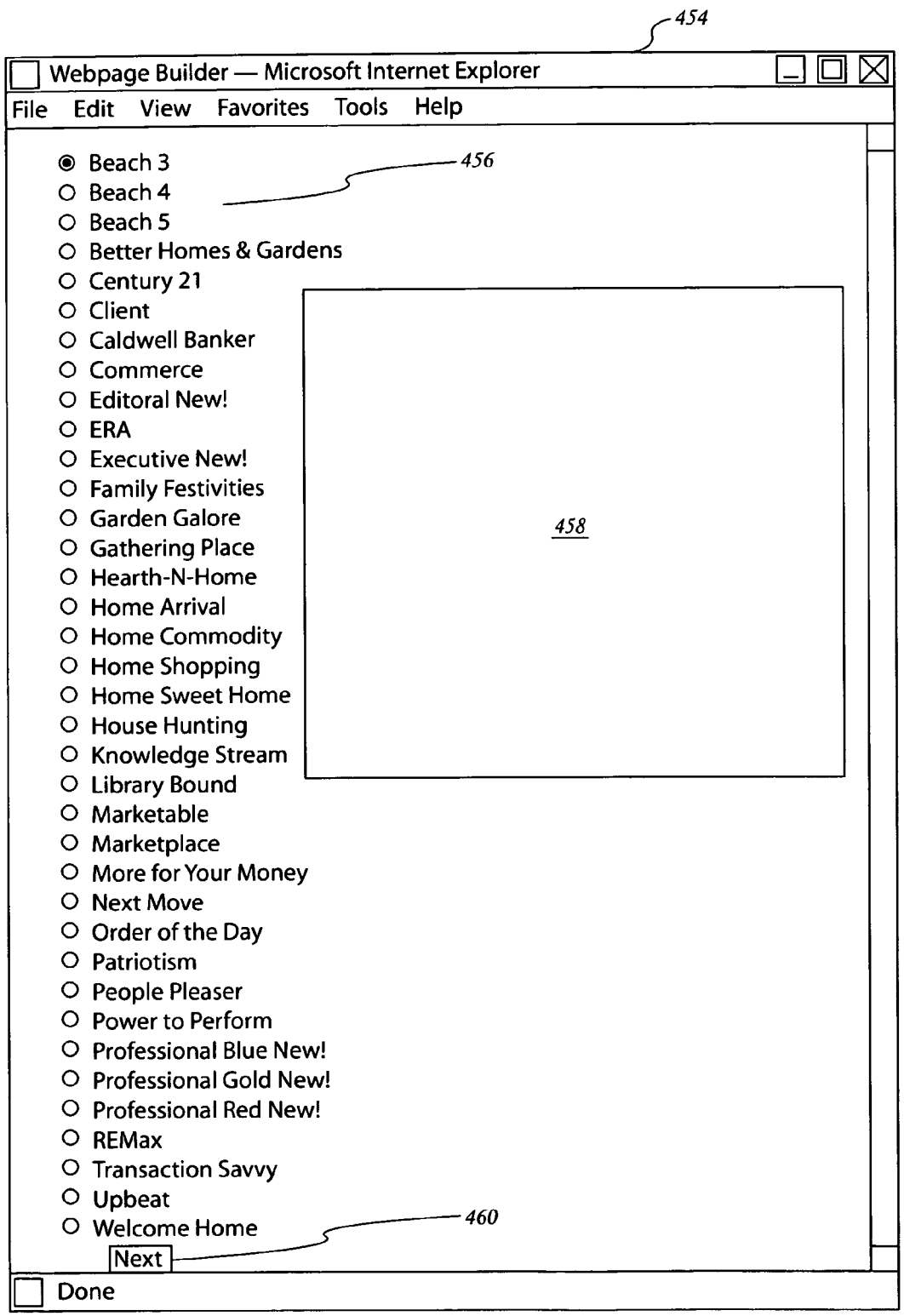
FIG. 21 is a screen shot of a "webpage builder" page according to the present invention.
Figure 22A:
Figure 23D:
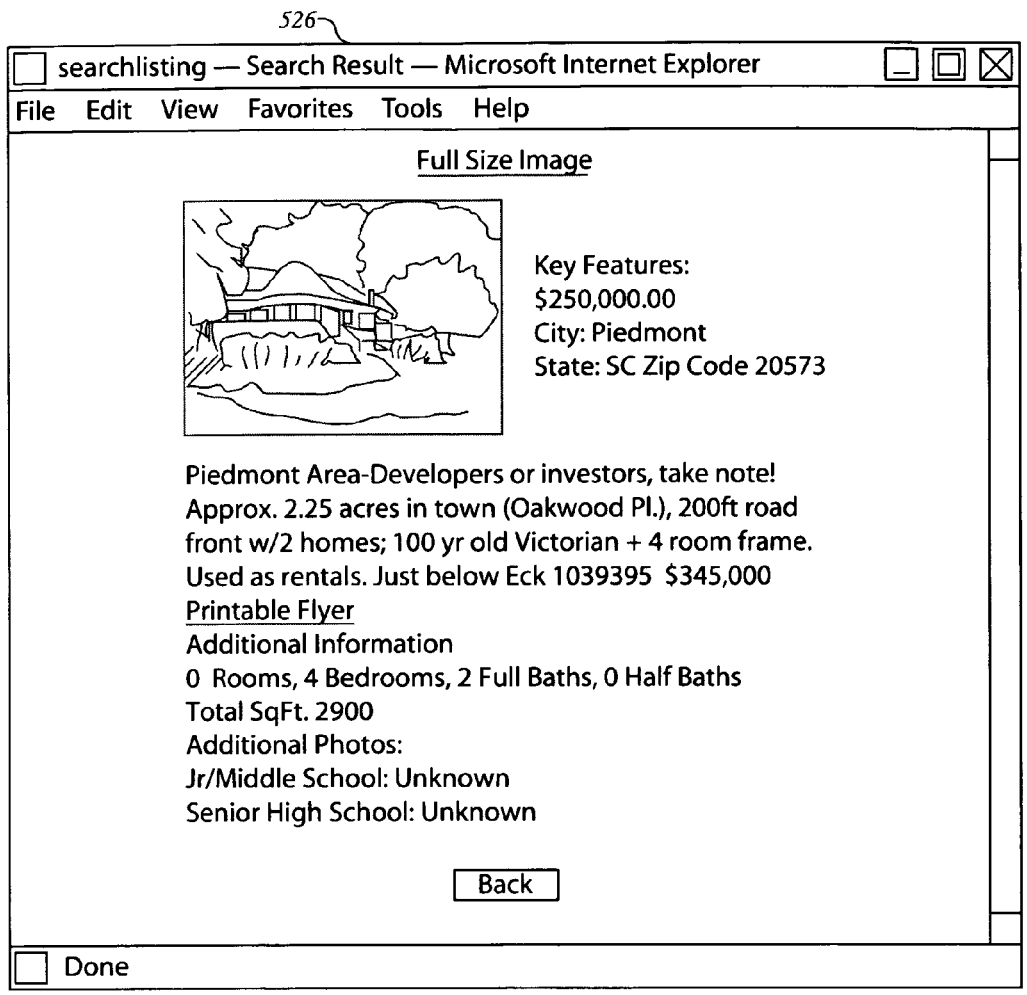
FIG. 23D is a screen shot of a second search results page according to the present invention.

The webpage tool 448 is provided from the toolbox page 208. The webpage tool 448 leads to two other tools: pick a theme tool 450 and the enter data tool 452. After selecting the webpage tool 448, the user is sent to a "webpage builder" page 454, shown in FIG. 21, which provides the pick a theme tool 450. The webpage builder page 454 has toggle buttons adjacent webpage themes 456. The user may preview the webpage themes by clicking on the titles of the webpage themes and viewing a preview in the preview window 458. Once the user has selected a theme, the user clicks on the toggle button adjacent the theme, and the clicks on the next button bar 460 at the bottom of the page.

Next, the user goes to an "add body to your page" page 462, shown in FIGS. 22A through 22D. The theme for the webpage selected is shown at the top of the page for review in another webpage preview window 464. A user name information section 469 is provided which has a field for entering the user name 470 and check boxes for a designation 472, as shown. The user may also select the font and style 468 for the name information to be displayed in on the webpage. A contact information section 474 is also provided with fields for entering telephone numbers 476, address 480, and additional names and numbers 478 for other employees or associates of the company. A heading section 490 is provided for adding headings and subheadings to the website to the website. Again the user may select font and style 468. A page body section 492 is provided to add text comments, as shown. A web address section 494 is provided so the user may select a domain name. The user adds three choices for domain names. Preferably, a free web address is provided with the website. A specialty section 496 is provided so that the user can add text 498 which will get the attention of web browser search engines like yahoo and google. A mug shot section 500 is provided so the user can insert a photo or use the same photo as previously provided with the advertisement builder discussed previously. A mug shot preview window 501 is provided. A company logo section 502 is provided so the user can either select a franchised company from a drop down menu if appropriate or upload their individual company logo. A logo preview window 503 is provided to preview the logo chosen. A links for the website section 504 is provided for additional links to appear on the website homepage. Additional links may also be added, at 506, if desired which includes a name of link and the url which appear on a separate links page. At the bottom of the page a build it section 508 is provided where the user simply clicks on the build my webpage button bar 510 at the bottom of the page. The webpage is then automatically built and the webpage url is selected from the three choices indicated.

The unique number designations utilized with the present invention in the area of real estate sales corresponds to an index of Multiple Listing Service (MLS) numbers (IDX). Every real estate market uses a central database of information regarding the property that is for sale in their area and an MLS number is assigned each listing. The host company gets the listing information MLS numbers downloaded from the MLS and display it on all of the Realtors' sites (user company sites) that are generated for that market showing all of the properties listed for sale in that market. This is especially advantageous for the small firms or new agents that have only a few listings because the IDX will show thousands, all on their web site.

For each website provided on the host webserver, using the present invention, an optional traffic analysis program may be included. The web analysis program monitors referring links so the user company can track the source of web referrals. An example of such a traffic report is Webalyzer which is available from Mr. Unix of Miami, Fla. A graphical traffic report is provided thereby.

The toolbox 208 provides a search data tool 513, shown in FIGS. 23A through 23D, which includes two search forms tools 515 and two search results forms 517. The two search form tools include an initial search page 512 that allows the user to select the real estate market from a drop down menu 514 that lists the real estate markets available. The user clicks on the submit query button bar 516 at the bottom of the page and goes to the second search page 518 which has search options 520 in the form of drop down menus. The drop down menu search options include company, price range, number of bedrooms, number of baths and square footage of home. Once the user has selected the search options desired, the user clicks on the submit query button bar 516, and is sent to a first search results page 522 that lists the listings which satisfy the users inquiry. The user clicks on the detail link 524 and is routed to a second search results page 526 which shows detailed information about the listing selected. The search tools permit users to find listings that fulfill customers' specific requests.

FIG. 23A allows the user or a client to directly select the real estate market where the inventory is located. As discussed hereinbefore, FIG. 2 demonstrates the arrangement of the websites and databases according to the present invention. The webpages are preferably hosted by the host company on resident database servers. The data is arranged in market, user companies and users (employees of user companies). Each market contains multiple user companies, each user company contains multiple employees. The data regarding each inventory listing is arranged based on the market where the inventory listing is located thereby making the inventory listing available for any user or user company in the area who wishes to access inventory listings in that particular market area. Customers of the user and user companies can access the webpages and search for inventory listings based on the market area.

An alternative embodiment of the present invention may include listings for rental property. FIG. 24 shows a screen shot of a "new rental form" page 601, which is used to add rental data to the inventory listings. The "new rental form" page 601 has a space for entering a unique inventory listing code 603, which is used as before for defining market area. Demographics information 605, including directions to the property, are entered in text fields. Critical dates are entered into the critical dates fields 607. Ad copy may be entered in the ad copy field 609 which information will be published in the print advertisements as well as on any websites. Lease data fields 611 are included for specifying lease information such as rent amount, term of lease, deposit and availability of the property. Pet information fields 613 are provided including toggle buttons indicating whether pets are allowed and other information, as shown in the Figures. Property specifics are entered using property information toggle buttons 615 and property information entry fields 617, as shown. The "new rental form" page 601 also provides drop down menus for school information 619 which are associated with the area market. A remarks field 621 for adding information that will be shown on websites but not in print advertisements is also provided. A submit listing to database button bar 623 is provided to submit the data to the database.

Figure 25B:
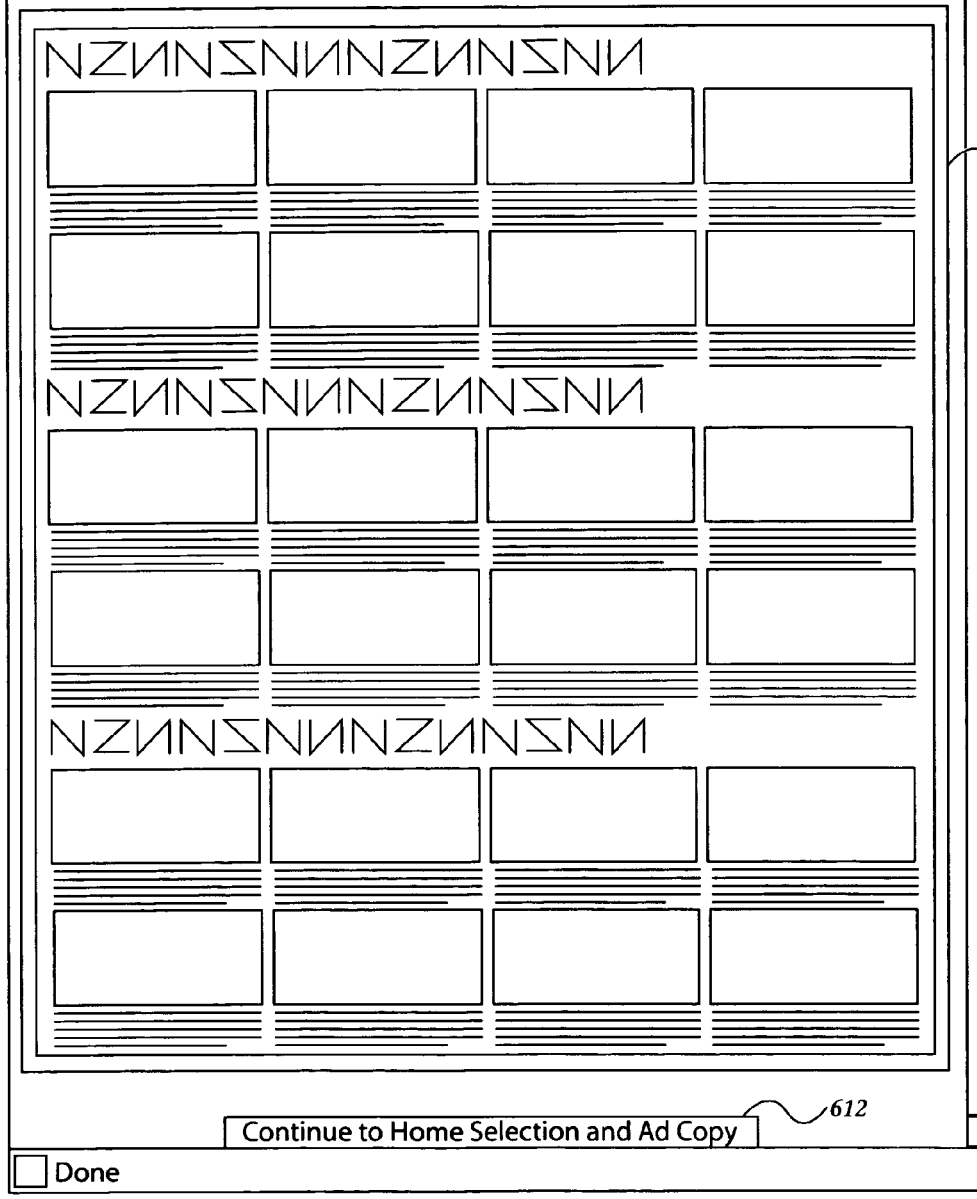

FIGS. 25A and 25B shows a screen shot of an "create an ad for rentals" page 600 which may be utilized by the present invention. The "create an ad for rentals" page 600 includes demographic information regarding the user (rental agent) which is automatically populated from the add agent page, and provides an area for adding header and border changes 602. The "create an ad for rentals" page includes an address to send pictures or to email digitalized pictures 604 for publication. A drop down menu 606 is provided for selecting print advertisement media and volume. The user enters in the number of rentals to be advertised in a text box 608 provided for that purpose. A sample advertisement format 610 is then shown at the bottom of the page 600. A continue button bar is provided to advance to the next page, which is a "your information" page 612, as shown in FIG. 26, which presents the demographics of the user and a list of the rentals 614 which may be selected for advertisement. A position fields 616 are provided for determining where the chosen rental listings should be placed in a print advertisement. An update ad copy button bar 618 is provided to update the advertisement listing.

Figure 27A:
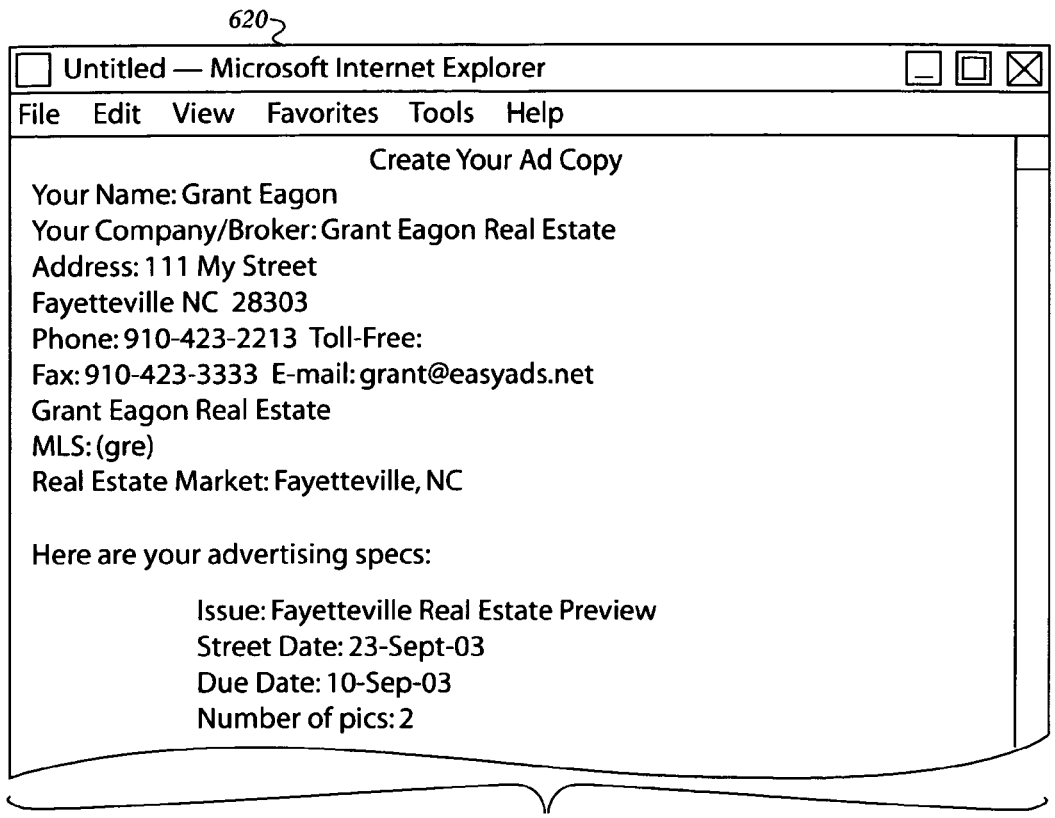

FIGS. 27A through 27C are a screen shot of a "create your ad copy" page 620. This page allows the user to review their data and modify the ad copy. Ad copy fields 622 are provided. Banner fields are also provided 624, as shown. A proof link 626 is provided so the user can preview the rental inventory listing. An ad confirmation button bar 628 is provided for the user to confirm the ad and copies. FIG. 28 is an "add confirmation" page 630 which includes billing instruction 632 as indicated and copy instructions when the copy doesn't fit. A submit button bar 634 is provided at the bottom of the "add confirmation" page. Once the submit button bar 634 is pushed, a "purchase order" page 636 is generated, as shown in FIG. 29.

It is to be understood that the present invention is not limited to the embodiments described above, but encompasses any and all embodiments within the scope of the following claims.

What is claimed is:

1. A method for managing inventory sales advertisement information by a host company over a network, comprising the steps of:
    a. forming an inventory advertisement based information network having at least two tiers of access with at least one host server and at least one remote company user I/O device;
    b. configuring the host server with an interactive inventory listing builder for generating inventory listings;
    c. configuring the host server to manage remote company user access to the inventory listings; and
    d. enabling remote access to the at least one host server for the remote company user to create and manage inventory listings.

2. The method of claim 1, further comprising:
a. having a tier of access with at least one remote employee user I/O device; and
b. providing at least one remote employee user designated by one remote company user.

3. The method of claim 2, wherein:
a. each inventory listing has a unique inventory code associated therewith and is associated with a unique market area; and
b. each company user and each employee user are associated with a unique market area, and wherein the employee user and company user are associated with the same unique market area.

4. The method of claim 1, wherein:
a. the host company further distributes print advertisements from the inventory listings generated.

5. The method of claim 1, further comprising:
a. configuring the host server with an interactive advertisement builder for generating advertisements; and
b. enabling the remote company user to manage the advertisement builder and generate advertisements thereby.

6. The method of claim 5, further comprising:
a. configuring the host server to keep record of all advertisements placed per media.

7. The method of claim 5, further comprising:
a. generating a purchase order corresponding to each advertisement.

8. The method of claim 5, wherein:
a. the interactive advertisement builder comprises the steps of
b. creating a new advertisement;
c. choosing a target media outlet;
d. inserting inventory listing; and
e. generating and saving advertisement.

9. The method of claim 1, further comprising:
a. configuring the host server with an interactive website builder for generating linked webpages; and
b. enabling the remote company user to manage the website builder and generate linked remote company webpages thereby.

10. The method of claim 9, further comprising:
a. housing the webpages on the host server;
b. having a tier of access with at least one client I/O device; and
c. configuring the host server to manage remote client access to inventory listings through webpages housed on the host server.

11. The method of claim 9, further comprising:
a. configuring the host server to monitor website referrals to keep track of which websites refer clients to hosted webpages.

12. The method of claim 9, further comprising:
a. providing at least one remote employee user designated by the remote company user; and
b. configuring the host server to manage remote company user and employee user access to the company user webpages.

13. The method of claim 12, wherein
a. different employee users are provided different levels of access to the inventory listing information.

14. The method of claim 9, wherein:
a. the interactive website builder comprises the steps of
b. selecting a template;
c. adding text;
d. adding images;
e. adding 360° photo;
f. adding inventory listings having unique listing codes;
g. choosing a domain; and
h. saving the website.

15. The method of claim 1, further comprising:
a. generating an advertising activity report by listing and by media.

16. The method of claim 1, further comprising:
a. providing e-mail options associated with each user.

17. The method of claim 16, wherein:
a. the e-mail options include alias e-mail and autoresponder e-mail options.

18. The method of claim 1, wherein:
a. each inventory listing has a unique inventory code associated therewith.

19. The method of claim 18, wherein:
a. each user and each inventory listing is associated with a unique market area.

20. The method of claim 1, wherein:
a. the interactive inventory listing builder comprises the steps of
b. creating a new inventory listing;
c. generating a unique listing code and associating it with the inventory listing;
d. adding a photo file; and
e. adding text data.

21. A system for an advertisement generating database, comprising:
a. means for entering information concerning a plurality of inventory listings from a plurality of remote locations over a network;
b. means for determining relevance of the entered information to a plurality of specified markets;
c. means for associating each inventory item to a specified market;
d. means for storing information concerning the inventory listing and the associated specified market;
e. means for accessing the entered information from a plurality of remote locations over a network to create and manage inventory listings; and
f. means for generating an advertisement containing selected inventory listings.

22. The system of claim 21, further comprising:
a. means for generating a website containing selected inventory listings;
b. wherein the database hosts a plurality of interactive websites generated thereby, each website associated with a market criteria, and having access to the market criteria associated inventory listings.

23. The system of claim 22, wherein:
a. The database files are arranged in a manner such that each market is separately stored so that websites and inventory items are associated under the market criteria, further comprising a plurality of websites corresponding to a plurality of user companies, each user company has a plurality of user employees associated thereto and each user has a website associated wither the users company.

24. The system of claim 21, comprising:
a. a database containing information regarding user specified inventory sales;
b. wherein each inventory listing is associated with a specified market criteria; and
c. wherein the information includes inventory related information, sales and rental information.

25. The system of claim 24, wherein:
a. the market criteria corresponds to a geographic area.

26. The systems of claim 21, wherein:
a. the database is available over a network to users.

27. A method for media-independent advertisement management by a host company over a network, comprising:
a. forming an inventory based information network having at least two tiers of access with at least one host server and at least one remote company user I/O device;
b. configuring the at least one host server with an interactive system for generating and managing advertisement inventory listings;
c. configuring the at least one host server to manage remote company user access to the advertising inventory listings; and
d. enabling remote access to the at least one host server for the remote company user to create and manage advertising inventory listings.

28. The method of claim 27, further comprising:
a. having a tier of access with at least one remote employee user I/O device; and
b. providing at least one remote employee user designated by one remote company user.

29. The method of claim 28, further comprising:
a. associating each individual advertisement inventory listing with a unique inventory code and with a unique market area; and
b. associating each company user and each employee user with a unique market area.

30. The method of claim 27, further comprising:
a. generating media-independent advertisements from the inventory lists generated on the at least one host server for distribution by the host company.

31. The method of claim 27, further comprising:
a. configuring the at least one host server with interactive advertisement builder for generating advertisements, an interactive website builder for generating linked webpages, or combinations thereof; and
b. enabling the remote company user to manage the advertisement builder and generate advertisements thereby, to manage the interactive website builder and generate linked remote company webpages thereby, or combinations thereof.

32. The method of claim 31, further comprising:
a. configuring the host server to keep record of all advertisements generated;
b. generating a purchase order corresponding to each advertisement; or
c. combination thereof.

33. The method of claim 31, further comprising:
a. housing the webpages on the host server;
b. having a tier of access with at least one client I/O device; and
c. configuring the host server to manage remote client access to advertisement inventory items through webpages housed on the at least one host server.

34. The method of claim 31, wherein:
a. the interactive advertisement builder comprises
b. creating a new advertisement,
c. choosing a target media outlet,
d. inserting advertisement inventory listings, and
e. saving the new advertisement.

35. The method of claim 34, further comprising:
a. providing different levels of access to the advertisement inventory listing information for different employee users.

36. The method of claim 31, further comprising:
a. configuring the at least one host server to monitor website referrals to keep track of which websites refer clients to hosted web pages.

37. The method of claim 31, further comprising:
a. providing at least one remote employee user designated by the remote company user; and
b. configuring the at least one host server to manage remote company user and employee user access to the computer user webpages.

38. The method of claim 31, wherein:
a. the interactive website builder comprises the steps of
b. selecting a template;
c. adding text;
d. adding images;
e. adding 360° photo;
f. adding advertising inventory item having unique listing codes;
g. choosing domain; and
h. saving the website.

39. The method of claim 27, further comprising:
a. generating an advertising activity report by listing and by media;
b. associating a unique inventory code with each advertisement inventory listing;
c. associating a unique market area with each user and with each advertisement inventory listing; or
d. combinations thereof.

40. The method of claim 27, wherein:
a. the interactive advertisement inventory item builder comprises
b. creating a new advertisement inventory item;
c. generating a unique listing code and associating the unique listing code with the advertisement inventory item;
d. adding at least one photo file associated with the new advertisement inventory item; and
e. adding text data associated with the new advertisement inventory item.

41. A system for a database, comprising:
a. means for entering information concerning a plurality of advertisement inventory items from a plurality of remote locations over a network;
b. means for determining relevance of the entered information to a plurality of specified markets;
c. means for associating each advertisement inventory item to a specified market;
d. means for storing information concerning the advertisement inventory item and the associated market; and
e. means for accessing the entered information from a plurality of remote locations over a network.

42. The system of claim 41, wherein:
a. means for generating an advertisement containing selected advertisement inventory items;
b. means for generating a website containing selected advertisement items, wherein the database hosts a plurality of websites generated thereby, each website associated with a market criteria, having access to the market criteria associated advertisement inventory items; or
c. combinations thereof.

43. The system of claim 42, wherein:
a. the database files arranged so that websites and advertisement inventory items are stored according to each market associated under the market criteria; and
b. a plurality of websites correspond to a plurality of user companies, each user company having a plurality of user employees associated thereto and each user has a website associate with the users company.

44. The system of claim 42, further comprising:

a. a database containing information regarding user specified advertisement inventory item sales;

b. wherein each advertisement inventory item is associated with a specified market criteria; and c. wherein the information includes inventory related information, sales, rental information, or combinations thereof.

45. The system of claim 42, wherein:

a. the database is available over a network to users;

b. the market criteria corresponds to a geographic area; or c. combinations thereof.

* * * * *